United States Patent
Katayama et al.

(10) Patent No.: US 8,982,943 B2
(45) Date of Patent: Mar. 17, 2015

(54) DATA PROCESSING DEVICE AND DATA PROCESSING METHOD

(75) Inventors: Taro Katayama, Yokohama (JP); Kazuo Fujimoto, Shijonawate (JP); Toshiya Noritake, Daito (JP); Shin-ichi Saeki, Sakai (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 2851 days.

(21) Appl. No.: 10/561,706

(22) PCT Filed: Jun. 29, 2004

(86) PCT No.: PCT/JP2004/009522
§ 371 (c)(1),
(2), (4) Date: Jun. 2, 2006

(87) PCT Pub. No.: WO2005/002221
PCT Pub. Date: Jan. 6, 2005

(65) Prior Publication Data
US 2006/0271983 A1 Nov. 30, 2006

(30) Foreign Application Priority Data
Jun. 30, 2003 (JP) ................................ 2003-186812

(51) Int. Cl.
*H04N 7/12* (2006.01)
*H04N 11/02* (2006.01)
(Continued)

(52) U.S. Cl.
CPC ............... *H04N 9/8211* (2013.01); *H04N 5/04* (2013.01); *H04N 5/4401* (2013.01); *H04N 21/4307* (2013.01); *H04N 21/4392* (2013.01); *H04N 21/44004* (2013.01)
USPC ..................................... 375/240.01

(58) Field of Classification Search
USPC ..................................... 375/240.01
See application file for complete search history.

(56) References Cited

U.S. PATENT DOCUMENTS 5,808,722 A * 9/1998 Suzuki ............................ 352/12
5,812,201 A 9/1998 Yoo
(Continued)

FOREIGN PATENT DOCUMENTS

JP 09-322161 12/1997
JP 11-112944 4/1999
(Continued)

OTHER PUBLICATIONS

Supplementary European Search Report for corresponding Application No. EP 04 74 6991 dated Jan. 7, 2010.
(Continued)

*Primary Examiner* — Chikaodili E Anyikire
(74) *Attorney, Agent, or Firm* — Renner, Otto, Boisselle & Sklar, LLP

(57) ABSTRACT

A data processor according to the present invention plays back video and audio from a data stream including video data and audio data, each of which is provided with time information representing its presentation time. The processor includes: a stream acquiring section for acquiring a first data stream and a second data stream continuously; an inserting section for inserting boundary-setting dummy data between the data streams; an analyzing section, which detects the dummy data and associates identification information with the video and audio data of each data stream; a control section for controlling the respective output timings of video data and audio data by reference to the time information of the video data and the time information of the audio data that are associated with the same piece of identification information; and an output section.

12 Claims, 18 Drawing Sheets

(51) Int. Cl.
*H04N 11/04* (2006.01)
*H04N 9/82* (2006.01)
*H04N 5/04* (2006.01)
*H04N 21/43* (2011.01)
*H04N 21/439* (2011.01)
*H04N 21/44* (2011.01)
*H04N 5/44* (2011.01)

(56) References Cited

U.S. PATENT DOCUMENTS 5,884,004 A    3/1999   Sato et al.
6,041,067 A *   3/2000   Takamori et al. ............. 370/514
6,396,874 B1    5/2002   Kato
2001/0036355 A1   11/2001   Kelly et al.
2004/0105660 A1    6/2004   Suzuki

FOREIGN PATENT DOCUMENTS

| | | |
|---|---|---|
| JP | 2000-165862 | 6/2000 |
| JP | 2002-016880 | 1/2002 |
| JP | 2002-199336 | 7/2002 |
| JP | 2002-281458 | 9/2002 |
| WO | 03/034725 A1 | 4/2003 |

OTHER PUBLICATIONS

International Search Report for corresponding Application No. PCT/JP2004/009522, mailed Oct. 5, 2004.

* cited by examiner

FIG.6
(a)  V_TSP
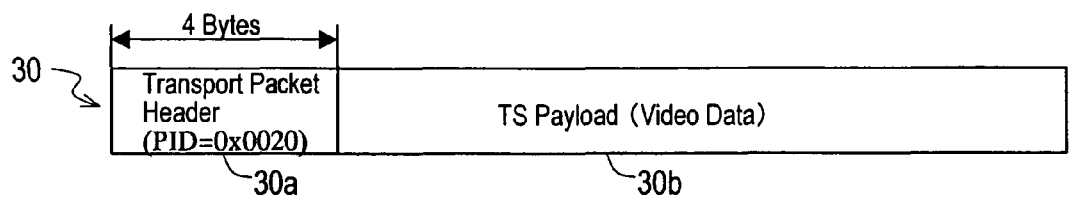
(b)  A_TSP
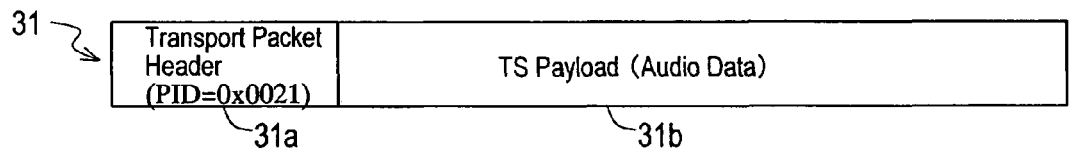

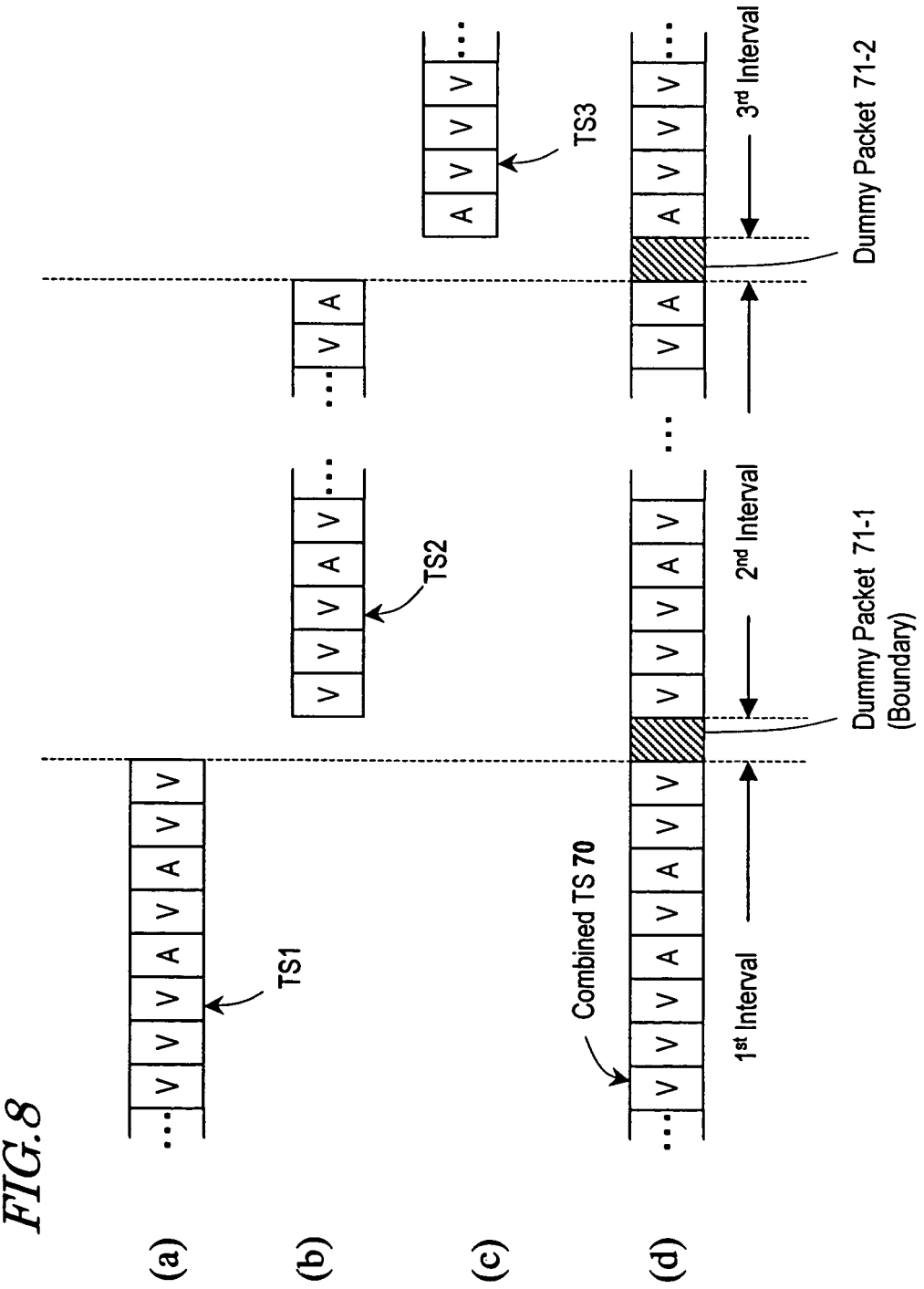

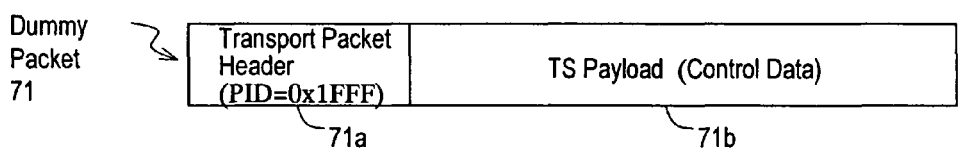

Dummy Packet 71 → | Transport Packet Header (PID=0x1FFF) | TS Payload (Control Data) |

71a, 71b (b)

| | Data Structure | Number of Bits | Data |
|---|---|---|---|
| Transport Packet Header (71a) | sync_byte | 8 | 0x47 |
| | transport_error_indicator | 1 | 0b |
| | payload_unit_start_indicator | 1 | 1b |
| | transport_priority | 1 | 1b |
| | PID | 13 | 0x1FFF |
| | transport_scrambling_control | 2 | 00b |
| | adaptation_field_control | 2 | 01b |
| | continuity_counter | 4 | Identification Information (0x0~0xF) |
| TS Payload (71b) | Dummy ID Information | 24 | "DUM"(0x44 55 4D) |
| | Dummy_ID | 4 | 0xF |
| | Reserved | 12 | 0xFFF |
| | audio_start_PTS | 33 | Audio Presentation Start Time |
| | video_start_PTS | 33 | Video Presentation Start Time |
| | audio_end_PTS | 33 | Audio Presentation End Time |
| | video_end_PTS | 33 | Video Presentation End Time |
| | Stuffing_data | 1300 | 0xFF, 0xFF, ··· |

91, 92

| Identification Information | APTS | Address |
|---|---|---|
| 1 | APTS1 | Address #1 |
| 1 | APTS2 | Address #2 |
| 2 | APTS3 | Address #3 |
| 2 | APTS4 | Address #4 |
| 2 | APTS5 | Address #5 |
| 3 | APTS6 | Address #6 |
| 3 | APTS7 | Address #7 |
| 3 | ⋮ | ⋮ |
| 3 | ⋮ | ⋮ |

DATA PROCESSING DEVICE AND DATA PROCESSING METHOD

TECHNICAL FIELD

The present invention relates to the technology of decoding and playing audio and video encoded data and more particularly relates to the technique of playing back associated audio and video of the same data stream synchronously with each other in playing back audio and video from a plurality of data streams continuously.

BACKGROUND ART

Recently, thanks to development of digital technologies, data, representing some content such as video like moving picture or still picture or music, can now be encoded and stored as an encoded data stream on a storage medium such as an optical disk or a hard disk. According to an MPEG standard such as ISO 11172 or ISO 13818, for example, audio is encoded as an audio encoded stream and video is encoded as a video encoded stream. Thereafter, data packets storing respective encoded data are arranged time-sequentially and multiplexed together, thereby making up an encoded data stream. Such multiplexing processing to make an encoded stream is called "system encoding". A system-encoded multiplexed data stream (i.e., a system stream) is transmitted along a single transmission line on a data packet basis, and then processed by a player. As a result, video and audio are played back.

Portions (a) through (d) of FIG. 1 show the data structure of a data stream 10. A player sequentially breaks down the data stream 10 shown in portion (a) of FIG. 1 into the data structures shown in portions (b) and (a) and outputs video and audio in the form shown in portion (d).

Portion (a) of FIG. 1 shows the data structure of the data stream 10, which may be an MPEG-2 transport stream, for example.

The data stream 10 is made up of video packets Vn (where n=1, 2, . . . ) and audio packets An (where n=1, 2, . . . ) that are multiplexed together. Each of those packets is comprised of a packet header and a payload that follows the packet header. Video-related data is stored in the payload of a video packet, while audio-related data is stored in the payload of an audio packet.

Portion (b) of FIG. 1 shows the data structure of a packetized elementary stream (PES) 11. The PES 11 is made by collecting the payload data of respective packets that form the data stream 10. The PES 11 is composed of a plurality of PES packets, each of which is comprised of a PES header and a PES payload.

Portion (c) of FIG. 1 shows the format of a video/audio elementary stream (ES). The video ES 12v includes a plurality of data units, each consisting of a picture header, picture data and a presentation time stamp VPTS defining the presentation time of the picture. Each set of picture data represents a single frame/field of picture either by itself or in combination with the picture data to be decoded earlier and/or later than itself. Likewise, the audio ES 12a also includes a plurality of data units, each consisting of a header, audio frame data and a presentation time stamp APTS defining the output timing of the audio frame. The presentation time stamp APTS, VPTS is data of 33 bits according to the MPEG-2 standard and stored in an area (Presentation_Time_Stamp) of the header (i.e., PES-H shown in portion (b) of FIG. 1) of the PES packet.

Portion (d) of FIG. 1 shows the video pictures and audio frames to be output. Each of the video pictures 13-1 and 13-2 is a single picture and represented by the picture data stored in its associated video ES 12v. The presentation time of each picture is designated by the presentation time stamp VPTS in its associated video ES 12v. By switching pictures to present in accordance with that information, moving pictures are presented on the screen of a video player. The output timing of each audio frame is designated by the presentation time stamp APTS in its associated audio ES 12a. By outputting each audio frame in accordance with that information, audio is output through a loudspeaker.

FIG. 2 shows the arrangement of functional blocks in a conventional player 120 that can play back the data stream 10 shown in portion (a) of FIG. 1. The player 120 acquires respective packets of the data stream 10, decodes it to the video and audio elementary streams based on the packets acquired, and then outputs the reproduced video pictures and audio frames.

Now consider what processing needs to be done by the player 120 to read two data streams No. 1 and No. 2 back to back and to play back the video pictures and audio frames of each data stream. Each of these data streams has the data structure shown in portion (a) of FIG. 1. When a stream reading section 1201 reads these data streams back to back, a single data stream is transmitted into the player 120. Thus, in the following description, a data portion of this single data stream corresponding to. Data Stream No. 1 will be referred to herein as a "first interval", while another data portion thereof corresponding to Data Stream No. 2 will be referred to herein as a "second interval". Also, the point where the streams to play switch each other will be referred to herein as a "boundary". The boundary is the end point of the first interval and the start point of the second interval.

In a data stream, audio and video packets are multiplexed together. The audio and video packets to play back at the same time are arranged in series and transmitted as a data stream. Accordingly, if reading a data stream is stopped, then just the audio or the video may be present even though the audio and video should be played back synchronously with each other. As a result, one of the audio and video may have relatively short playback duration and the other relatively long playback duration. This phenomenon will occur in a portion of the boundary near the end point of the first interval described above. If such a data stream is decoded, then the video may have been played fully but the audio may be partially missing, or the audio may have been reproduced fully but the video may be partially missing, in the vicinity of the end point of the first interval (e.g., one second before the presentation end time of the first interval). In addition, since reading is started halfway even at the start point of the second interval, audio may be missing for a while after the video has started being played back or video may be missing for a while after the audio has started being reproduced.

Particularly if the video and audio of the first and second intervals are played back continuously, then audio and video, which belong to mutually different intervals before and after the boundary and which should not be played back synchronously with each other, happen to be played back at the same time. That is why the player 120 inserts a dummy packet in switching the objects to read. FIG. 3(a) shows a dummy packet 1304 inserted between the first and second intervals. A dummy packet inserting section 1202 inserts the dummy packet 1304 into the end of a data stream 1302 and then combines a data stream 1303 with the data stream 1302. In this manner, a data stream 1301, which can be divided into the first and second intervals at the dummy packet 1304, can be obtained.

The data stream 1302 for the first interval, dummy packet 1304, and data stream 1303 for the second interval are continuously supplied to a stream splitting section 1203. On receiving the data stream 1302 for the first interval, the stream splitting section 1203 separates audio packets (such as A11) and video packets (such as V11, V12, V13) from the stream 1302 and then sequentially stores them in a first audio input buffer 1205 and a first video input buffer 1212 while decoding them to the audio ES and video ES (i.e., while performing system decoding).

When the stream splitting section 1203 detects the dummy packet 1304, a first switch 1204 is turned, thereby connecting the stream splitting section 1203 to a second audio input buffer 1206. At the same time, a second switch 1211 is also turned, thereby connecting the stream splitting section 1203 to a second video input buffer 1213.

Thereafter, the stream splitting section 1203 separates audio packets (such as A21) and video packets (such as V21, V22, V23) from the data stream 1303 for the second interval and then sequentially stores them in the second audio input buffer 1206 and the second video input buffer 1213 while decoding them to the audio ES and video ES (i.e., while performing system decoding).

An audio decoding section 1208: reads the audio ES from the first audio input buffer 1205 by way of a third switch 1207, decodes it (i.e., performs elementary decoding), and then sends out resultant audio frame data to an audio output buffer 1209. An audio output section 1210 reads out the decoded audio frame data from the audio output buffer 1209 and outputs it.

Meanwhile, a video decoding section 1215 reads the video stream from the first video input buffer 1212 by way of a fourth switch 1214, decodes it (i.e., performs elementary decoding), and then sends out resultant video picture data to a video output buffer 1216. A video output section 1217 reads out the decoded video picture data from the video output buffer 1216 and outputs it.

The audio decoding section 1208 and video decoding section 1215 are controlled by an AV synchronization control section 1218 so as to start and stop decoding at designated timings. The audio output section 1210 and video output section 1217 are also controlled by the AV synchronization control section 1218 so as to start and stop outputting at designated timings.

When the respective video and audio packets have been read from the first interval, the third and fourth switches 1207 and 1214 are turned so as to connect the second audio input buffer 1206 to the audio decoding section 1208 and the second video input buffer 1213 to the video decoding section 1215, respectively. Thereafter, the same decoding and output processing is carried out just as described above.

FIG. 3(b) shows the timing relation between the respective presentation times of the audio and video streams 1305 and 1306 for the first interval and the audio and video streams 1307 and 1308 for the second interval. Each of these streams is supposed to be the elementary stream (ES) shown in portion (c) of FIG. 1. The presentation times of the audio frames and video pictures forming these streams are defined by the presentation time stamps APTS and VPTS as shown in portion (c) of FIG. 1.

As can be seen from FIG. 3(b), the presentation end time Ta of the audio stream 1305 does not agree with the presentation end time Tb of the video stream 1306 in the first interval. It can also be seen that the presentation start time Tc of the audio stream 1307 does not agree with the presentation start time Td of the video stream 1308 in the second interval, either.

A player that can play back a moving picture continuously before and after a skip point is disclosed in Japanese Patent Application Laid-Open Publication No. 2000-36941, for example. This player will be referred to herein as a "first conventional example". Hereinafter, it will be described how to play back the video streams 1306 and 1308 shown in FIG. 3(b) continuously by using such a player.

As shown in FIG. 3(b), in the interval between the times Ta and Tb just before the boundary, the audio stream 1305 is missing. That is why the audio decoding section 1208 once stops decoding after having decoded the audio stream for the first interval. Next, the audio stream 1307 for the second interval is input from the second audio input buffer 1206 to the audio decoding section 1208.

In a part of the second interval between the times Tc and Td, the video stream 1308 is missing. That is why the portion of the audio stream between the times Tc and Td is not decoded but discarded. This discarding processing is carried out by the audio decoding section 1208 that shifts the reading address on the second input buffer 1206 to an address where a portion of data corresponding to the interval between the times Tc and Td is stored. This discarding processing can be done in a much shorter time than the processing of decoding the audio stream. Thus, the audio decoding section 1208 waits for the AV synchronization control section 1218 to instruct it to restart decoding the audio stream from the time Td on. Meanwhile, before the audio decoding section 1208 enters the standby state of waiting for the instruction to restart decoding from the time Td on, the video decoding section 1215 decodes and outputs the video stream up to the time Tb of the first interval.

Suppose the rest of the video stream from the post-boundary time Td on has been stored in the second video input buffer 1213 when the video stream has been decoded up to the time Tb. In that case, the video decoding section 1215 starts decoding the rest of the video stream from the time Td on immediately after having decoded the video stream up to the time Tb. As a result, the video up to the time Tb and the video from the time Td on are played back continuously. When the video stream restarts being decoded at the time Td, the AV synchronization control section 1218 activates the audio decoding section 1208 that has been in the standby mode, thereby making the decoding section 1208 start to decode the audio stream 1307 at the time Td. In this manner, the video streams can be played back continuously and the audio and video can be output synchronously with each other across the boundary.

Optionally, video can also be played back continuously across the boundary even by the technique disclosed in Japanese Patent Application Laid-Open Publication No. 2002-281458 or Japanese Patent Application Laid-Open Publication No. 10-164512. For example, according to Japanese Patent Application Laid-Open Publication No. 2002-281458, a portion of the audio stream in the interval between the times Tc and Td shown in FIG. 3(b) is discarded by using presentation time stamps added to the audio streams 1305 and 1307, thereby realizing continuous playback across the boundary. It should be noted that by using the presentation time stamps, if a video stream is missing with respect to an audio stream, then a portion of the audio stream may be discarded. As a result, the load of processing the audio stream unnecessarily can be saved and the streams of the second interval can be read quickly. Consequently, the video can be played back continuously before and after the boundary.

According to the conventional technique, video can be played back continuously across the boundary but the video may sometimes be out of sync with audio. This problem will be described in detail with reference to FIGS. 4(a) and 4(b).

FIG. 4(a) shows a data stream 1401 for which three intervals are defined by two boundaries. The data stream 1401 includes two dummy packets No. 1 and No. 2. Dummy Packet No. 1 is inserted after an audio packet A11 of the data stream 1402 for the first interval. Thereafter, the data stream 1403 for the second interval is read out. Subsequently, Dummy Packet No. 2 is inserted after the last video packet V22 of the data stream 1403. And then the data stream 1404 for the third interval is read out.

It should be noted that only video packets V21 and V22 are included in the second interval and there is no audio packets there in this case. This means that a short interval corresponding to just several video frames at most is defined as the second interval and that there are no audio packets, which are long enough to be a decodable audio frame, within the data stream 1403 for that interval. Such an interval is generated when a data stream recorded in compliance with the MPEG-2 standard is edited with temporally very short intervals specified.

FIG. 4(b) shows the timing relation between the respective presentation times of audio and video streams 1405 and 1406 for the first interval, a video stream 1407 for the second interval, and audio and video streams 1408 and 1409 for the third interval. In FIG. 4(b), each stream is also supposed to be a stream that has been decoded down to the level of elementary stream (ES) shown in portion (c) of FIG. 1.

First, it will be described how to play back video. Before and after Boundary No. 1, picture data up to the video packet V11 of the first interval is stored in the first video input buffer 1212 and picture data of the video packets V21 and V22 of the second interval is stored in the second video input buffer 1213. Every data will be decoded sequentially after that to play back video continuously. Subsequently, after Boundary No. 2, the storage location of the video stream for the third interval is switched into the first video input buffer 1212 again. Data is decoded under a similar control to Boundary No. 1 and video is output continuously.

Next, audio reproducing processing will be described. First, at a time Ta, the audio decoding section 1208 once stops decoding and the storage location of the audio stream is changed from the first audio input buffer 1205 into the second audio input buffer 1206. Next, the data stream of the third interval is read out from the storage medium 121 and the audio stream of the third interval is stored in the second audio input buffer 1206.

The conventional player uses presentation time stamps to decode an audio stream and reproduce audio. If the presentation time stamp provided for the video stream 1407 for the second interval and the presentation time stamp provided for the video stream 1409 for the third interval simply increase (particularly when the values of the presentation time stamps increase monotonically in the interval between the times Tc and Tf), then the processing can be advanced smoothly. The audio decoding section 1208 and audio output section 1210 may stand by until the video decoding section 1215 and video output section 1217 finish their processing at the time Tf. Then, the audio decoding section 1208 and audio output section 1210 may start processing at the time Tf and output audio synchronously with the video.

However, the presentation time stamps provided for the data streams of the respective intervals is not regulated among the streams. That is why it is impossible to determine in advance, or predict, the magnitudes of the presentation time stamp values of the respective intervals. Accordingly, if the playback is controlled in accordance with the presentation time stamps, data that should not be discarded may be lost by mistake and other inconveniences may be caused, thus interfering with desired continuous playback. For example, supposing the value APTS_f of the presentation time stamp of the audio frame to be output at the time Tf is smaller than the value VPTS_c of the presentation time stamp of the video picture to be output at the time Tc, then the conventional player discards the audio stream for the third interval before or while the video of the second interval is played back. Particularly when APTS_f is much smaller than VPTS_c, a huge quantity of data of the audio stream of the third interval is discarded. In that case, even after the video of the third interval has started to be played back, no audio will be output at all.

Also, if the value APTS_f of the presentation time stamp at the time Tf is equal to or greater than the value VPTS_c of the presentation time stamp of the top video picture of the second interval and equal to or less than the value VPTS_d of the presentation time stamp of the last video picture, then the audio of the third interval, which should start being reproduced at the time Tf, starts being reproduced while the video of the second interval is being played back.

An object of the present invention is to play back audio and video synchronously with each other, with no time lag allowed between them, in playing a plurality of data streams continuously.

DISCLOSURE OF INVENTION

A data processor according to the present invention plays back video and audio from a data stream including video data and audio data. Each of the video and audio data is provided with time information representing its presentation time. The data processor includes: a stream acquiring section for acquiring a first data stream and a second data stream continuously; an inserting section for inserting boundary-setting dummy data into a data location where the first and second data streams switch each other; an analyzing section, which detects the dummy data, assigns different pieces of identification information to the first and second data streams, and associates the identification information with the video and audio data of each said data stream; a control section for controlling the respective output timings of video represented by video data and audio represented by audio data by reference to the time information of the video data and the time information of the audio data that are associated with the same piece of identification information; and an output section for outputting the video and the audio at the output timings.

The control section may find the respective presentation end times of the video and the audio of the first data stream according to the time information added to the video data and the time information added to the audio data. If the presentation end time of the audio is later than that of the video, the control section may stop outputting the audio from the presentation end time of the video through the presentation end time of the audio.

The control section may find the respective presentation start times of the video and the audio of the second data stream according to the time information added to the video data and the time information added to the audio data. If the presentation start time of the audio is earlier than that of the video, the control section may stop outputting the audio from the presentation start time of the audio through the presentation start time of the video.

When finding given video data and audio data associated with different pieces of identification information, the control section may get only the video represented by the video data output first. When finding video data, obtained after the video has been played back, and the audio data associated with the same piece of identification information, the control section may control the output timings of the video represented by the video data and the audio represented by the audio data in accordance with the time information of the video data and the time information of the audio data that are associated with the same piece of identification information.

The stream acquiring section may acquire three or more data streams continuously. The inserting section may insert dummy data, which has monotonically increasing or decreasing values corresponding to the identification information, into every data location where associated two of the continuously acquired data stream switch each other.

When finding the piece of identification information associated with the audio data agreeing with a piece of identification information associated with video data representing video that was output in the past, the control section may stop outputting audio represented by the audio data and start outputting audio represented by audio data having the same piece of identification information as that associated with the video data of the video being output currently.

When finding the piece of identification information associated with the audio data agreeing with a piece of identification information associated with video data representing video that has not been output yet, the control section may stop outputting audio represented by the audio data and may not start outputting the audio represented by the audio data until the piece of identification information agrees with a piece of identification information associated with video data acquired afterward.

Each said data stream may have a packet structure including packets that store video data and packets that store audio data. The inserting section may insert the boundary-setting dummy packet between the last packet of the first data stream and the first packet of the second data stream.

A data processing method according to the present invention is designed to play back video and audio from a data stream including video data and audio data. Each of the video and audio data is provided with time information representing its presentation time. The method includes the steps of: acquiring a first data stream and a second data stream continuously; inserting boundary-setting dummy data into a data location where the first and second data streams switch each other; detecting the dummy data, assigning different pieces of identification information to the first and second data streams, and associating the identification information with the video and audio data of each said data stream; controlling the respective output timings of video represented by video data and audio represented by audio data by reference to the time information of the video data and the time information of the audio data that are associated with the same piece of identification information; and outputting the video and the audio at the output timings.

The step of controlling may include the steps of: finding the respective presentation end times of the video and the audio of the first data stream according to the time information added to the video data and the time information added to the audio data, and if the presentation end time of the audio is later than that of the video, stopping outputting the audio from the presentation end time of the video through the presentation end time of the audio.

The step of controlling may include the steps of: finding the respective presentation start times of the video and the audio of the second data stream according to the time information added to the video data and the time information added to the audio data, and if the presentation start time of the audio is earlier than that of the video, stopping outputting the audio from the presentation start time of the audio through the presentation start time of the video.

The step of controlling may include the steps of: when finding given video data and audio data associated with different pieces of identification information, getting only the video represented by the video data output first, and when finding video data, obtained after the video has been played back, and the audio data associated with the same piece of identification information, controlling the output timings of the video represented by the video data and the audio represented by the audio data in accordance with the time information of the video data and the time information of the audio data that are associated with the same piece of identification information.

The step of acquiring may include acquiring three or more data streams continuously, and the step of inserting may include inserting dummy data, which has monotonically increasing or decreasing values corresponding to the identification information, into every data location where associated two of the continuously acquired data stream switch each other.

The step of controlling may include the steps of: when finding the piece of identification information associated with the audio data agreeing with a piece of identification information associated with video data representing video that was output in the past, stopping outputting audio represented by the audio data and starting outputting audio represented by audio data having the same piece of identification information as that associated with the video data of the video being output currently.

The step of controlling may include the steps of: when finding the piece of identification information associated with the audio data agreeing with a piece of identification information associated with video data representing video that has not been output yet, stopping outputting audio represented by the audio data and not starting outputting the audio represented by the audio data until the piece of identification information agrees with a piece of identification information associated with video data acquired afterward.

Each said data stream may have a packet structure including packets that store video data and packets that store audio data. The step of inserting may include inserting the boundary-setting dummy packet between the last packet of the first data stream and the first packet of the second data stream.

BRIEF DESCRIPTION OF DRAWINGS

Portions (a) through (d) of FIG. 1 show the data structure of a data stream 10.

Figure 5:
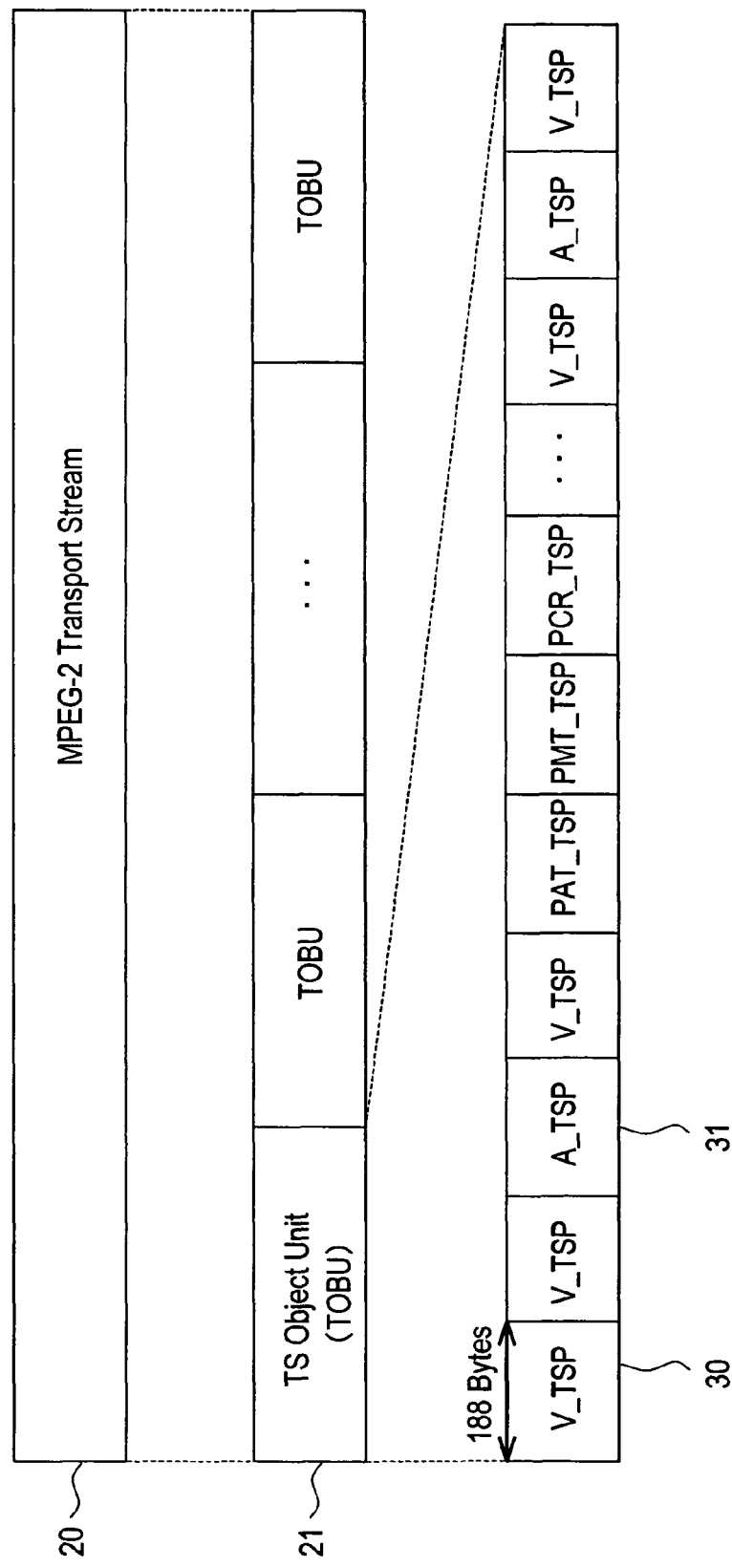

FIG. 5 shows the data structure of a transport stream 20.

FIG. 6(*a*) shows the data structure of a video TS packet 30 and FIG. 6(*b*) shows the data structure of an audio TS packet 31.

Figure 7:
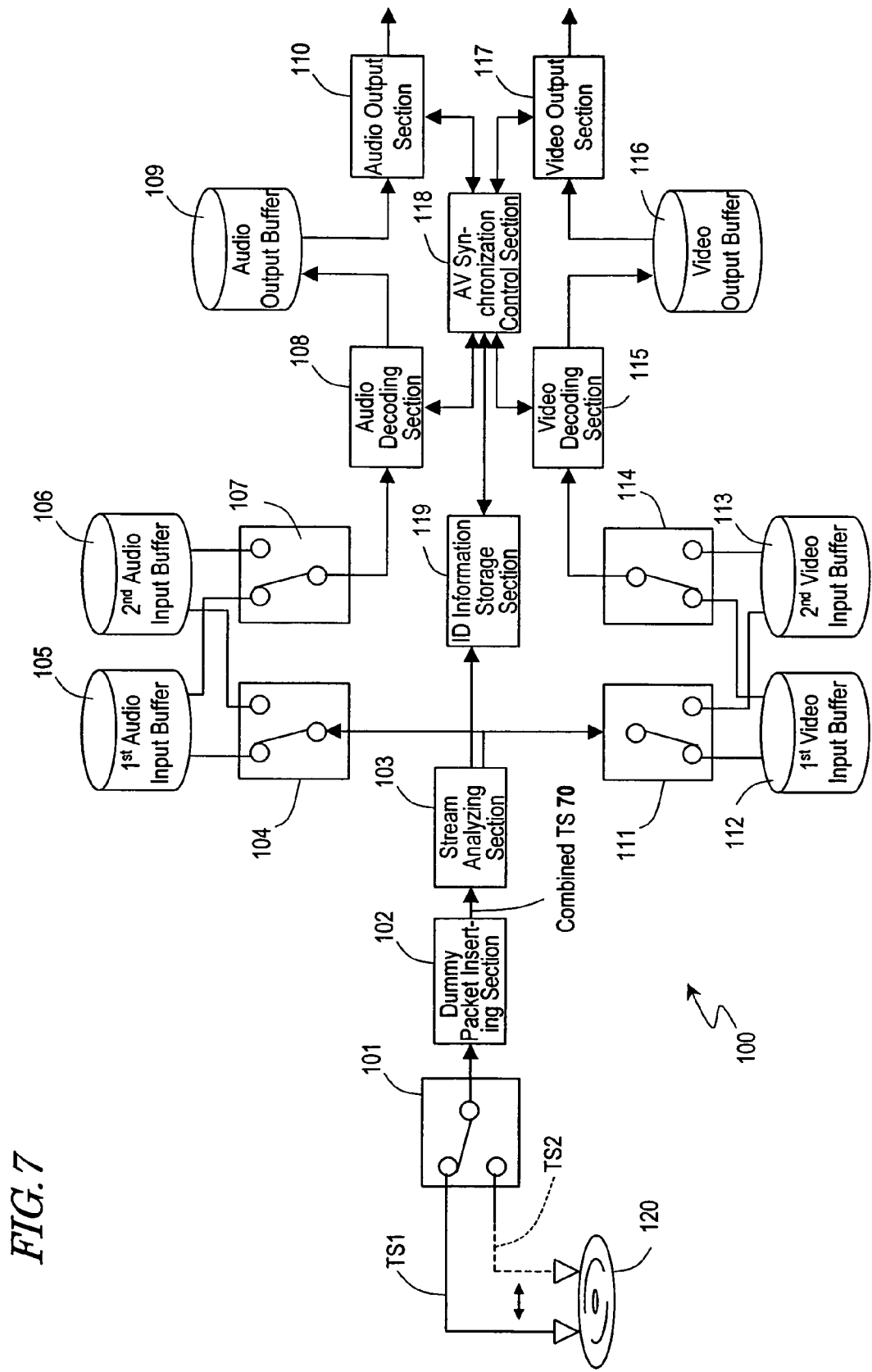

FIG. 7 shows an arrangement of functional blocks in a player 100 according to a preferred embodiment of the present invention.

Portions (a), (b) and (c) of FIG. 8 respectively show TS1, TS2 and TS3 that have been read out, and Portion (d) of FIG. 8 shows a TS 70 into which dummy packets have been inserted.

FIG. 9(*a*) shows the data structure of a dummy packet 71 and FIG. 9(*b*) shows a specific data structure of the dummy packet 71.

Figure 10:
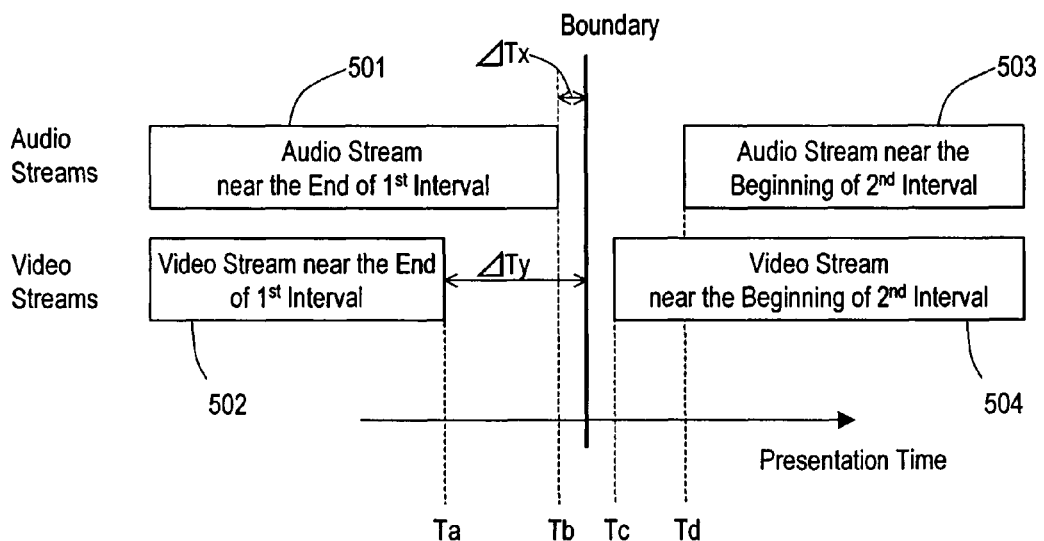

FIG. 10 shows a first exemplary relationship between the presentation times of audio and video streams in the vicinity of the boundary.

Figure 11:
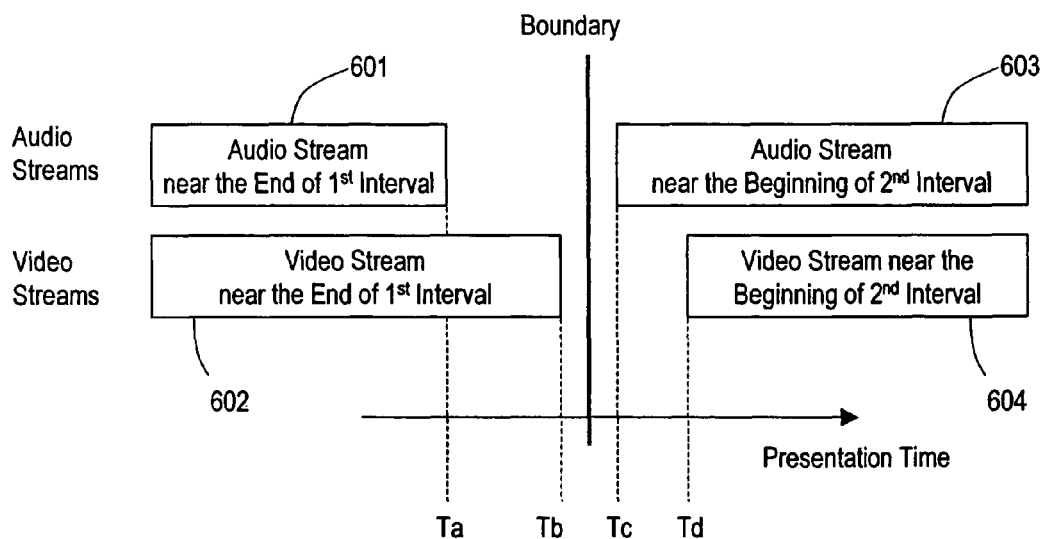

FIG. 11 shows a second exemplary relationship between the presentation times of audio and video streams in the vicinity of the boundary.

Figure 12:
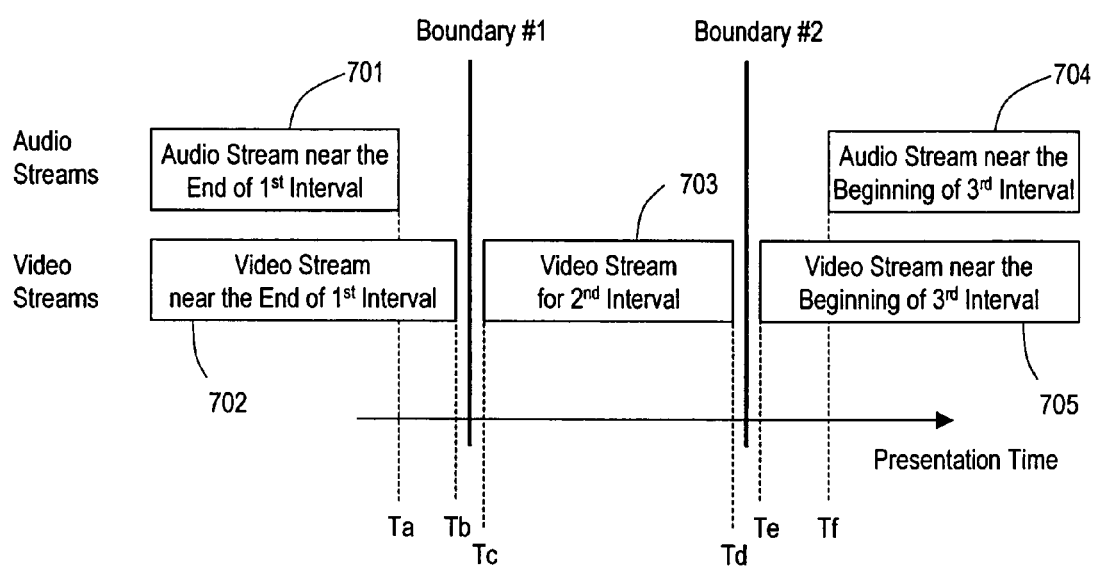

FIG. 12 shows a third exemplary relationship between the presentation times of audio and video streams.

Figure 13:
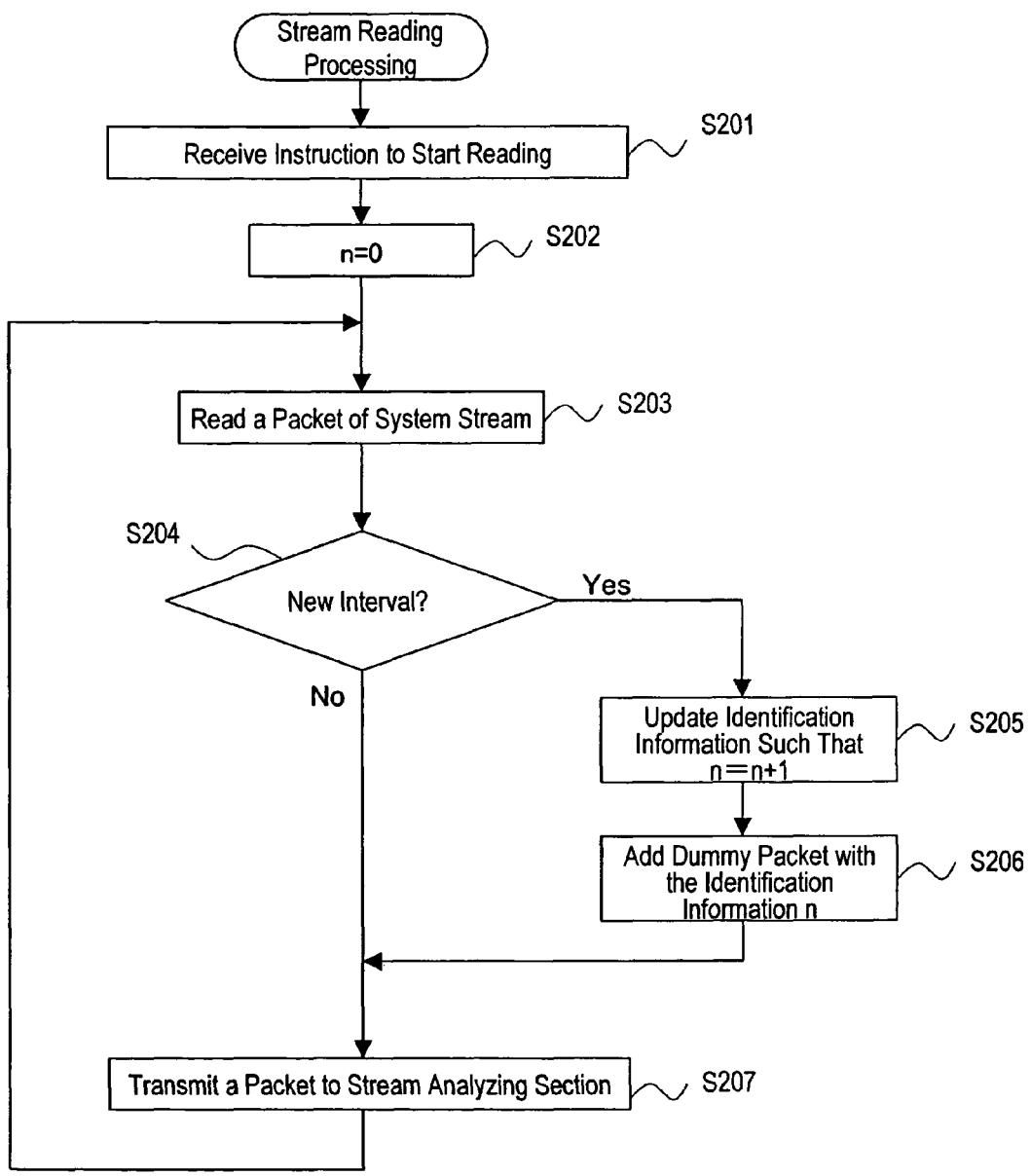

FIG. 13 shows the procedure of processing to be done in reading a number of TS continuously.

Figure 14:
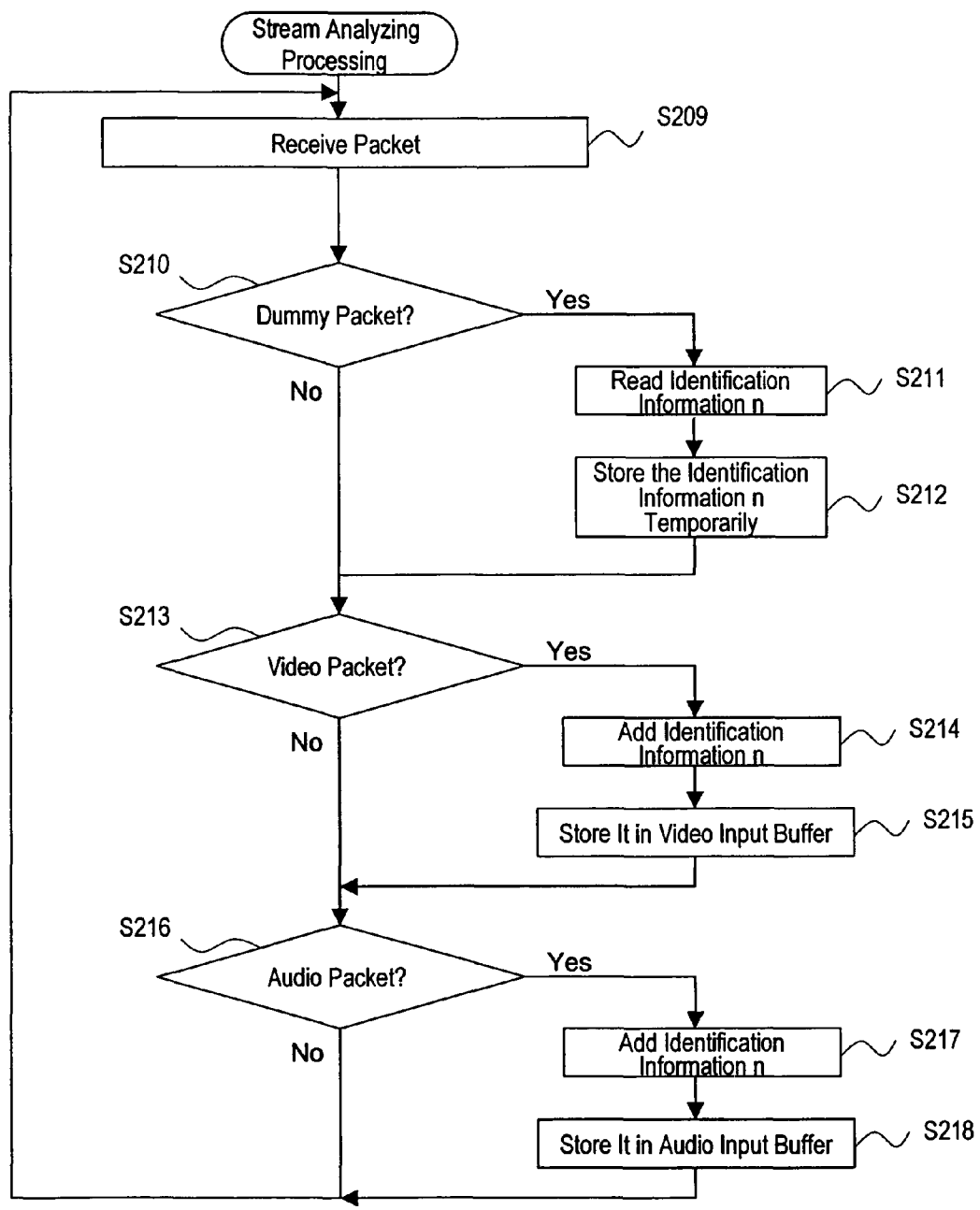

FIG. 14 shows the procedure of processing to be done by the stream analyzing section 103.

Figure 15:
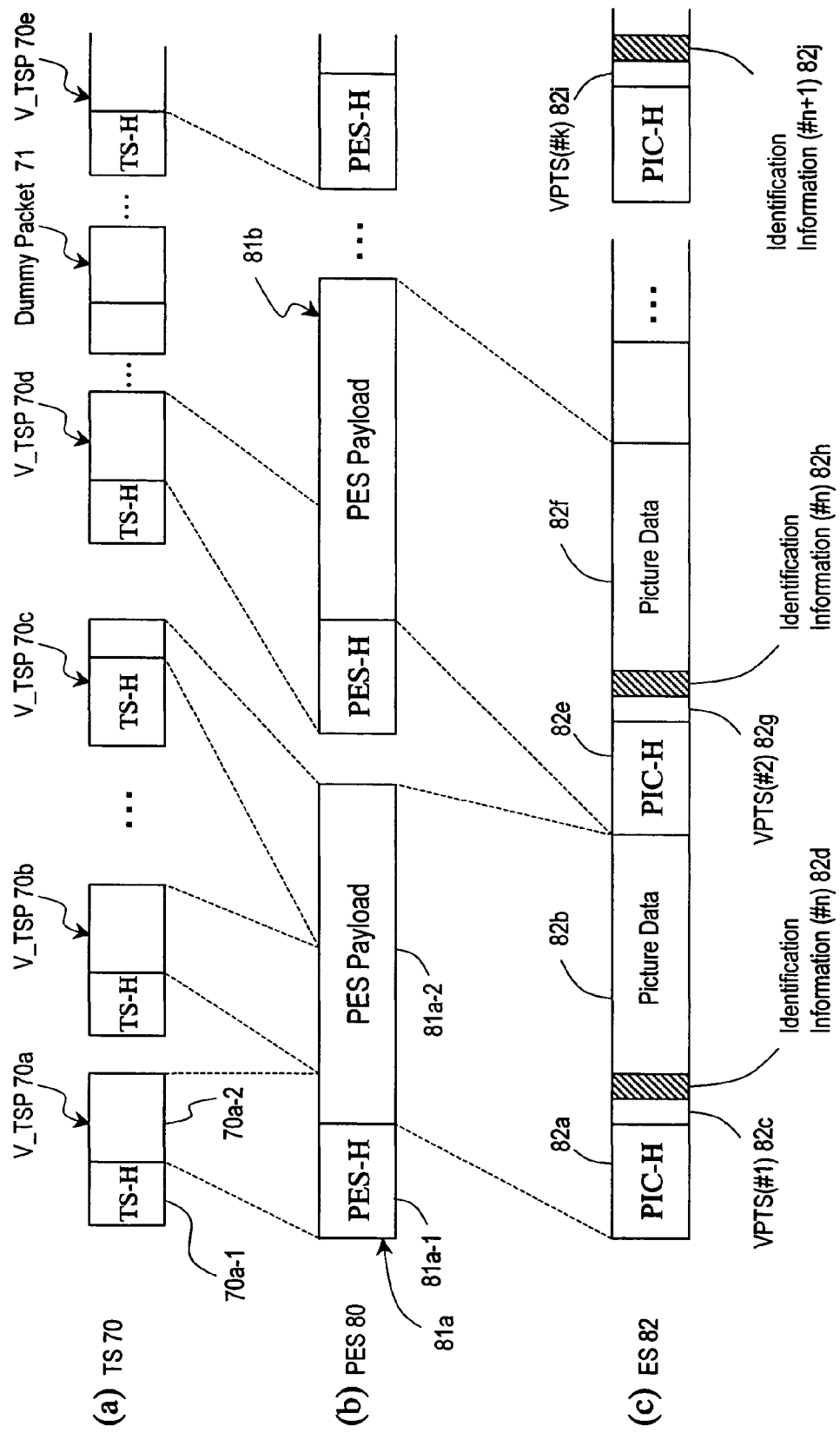

Portion (a) of FIG. 15 shows a TS 70 that has been input to the stream analyzing section 103, Portion (b) of FIG. 15 shows the data structure of a PES 80, and Portion (c) of FIG. 15 shows the data structure of a video ES 82.

Figures 16, 17:
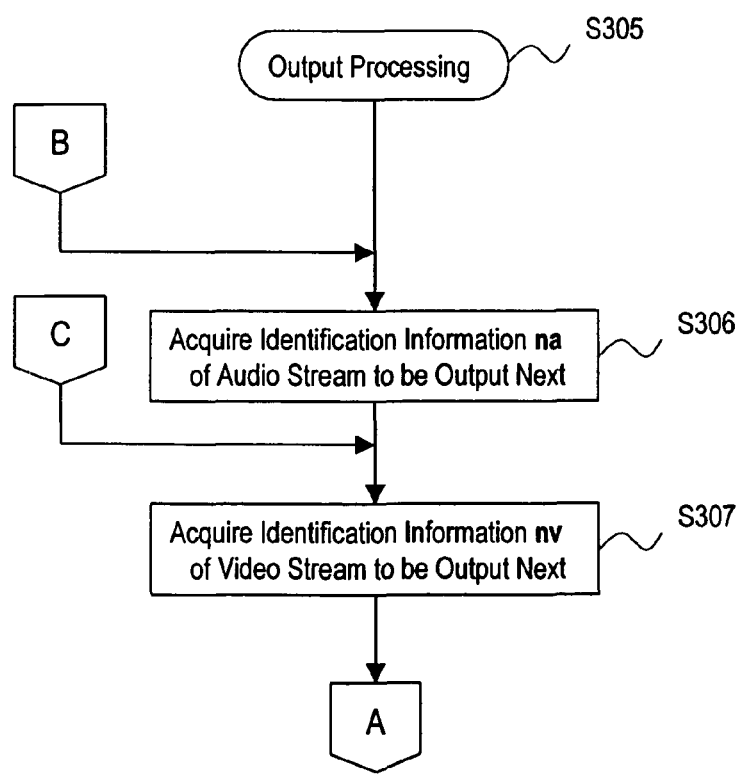

FIG. 16 shows an audio management table in which frame data and identification information are associated with each other.

FIG. 17 shows the procedure of preprocessing to be done by the AV synchronization control section 118 to output audio and video.

Figure 18:
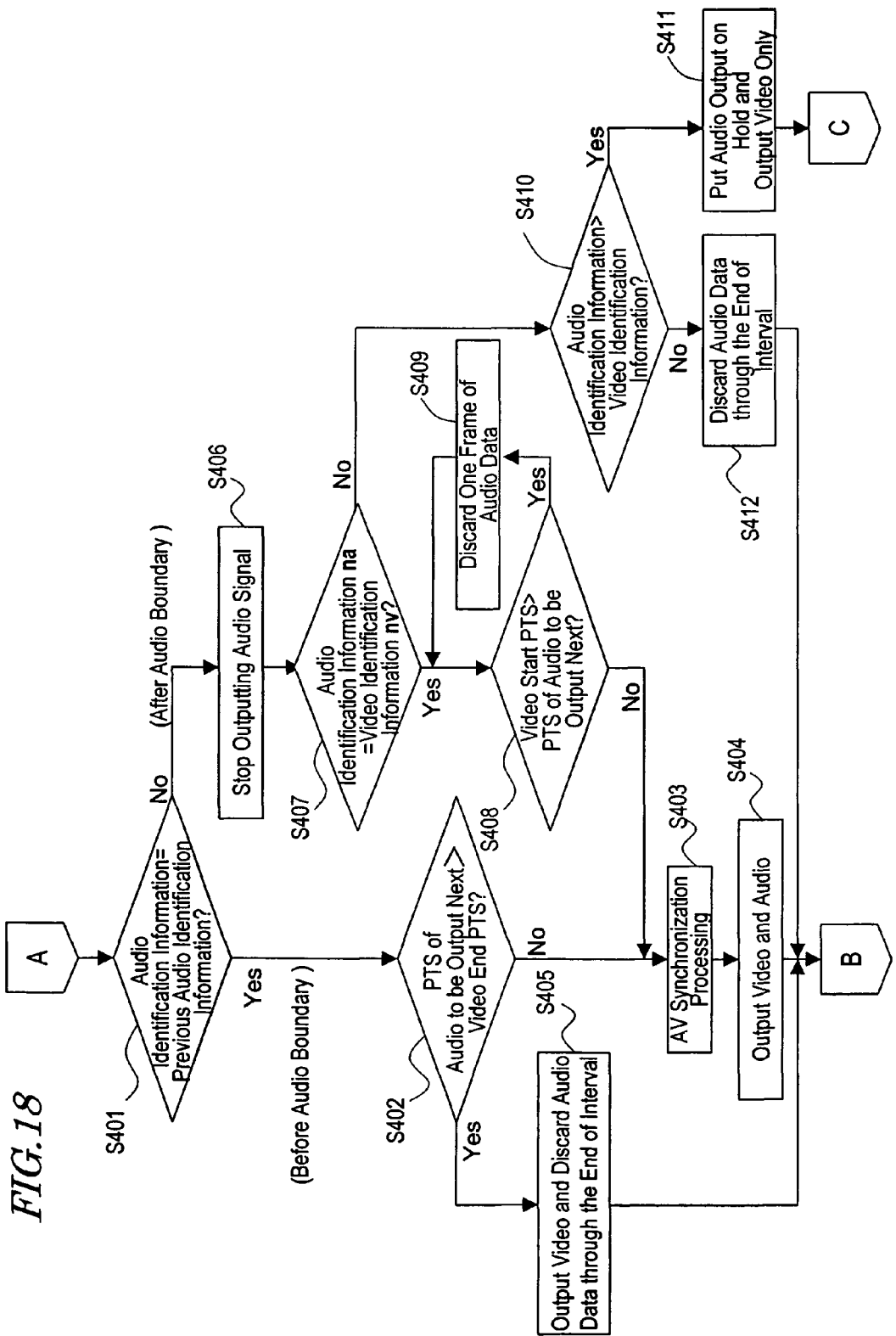

FIG. 18 shows the procedure of main processing to be done by the AV synchronization control section 118 to output audio and video.

Figure 19:
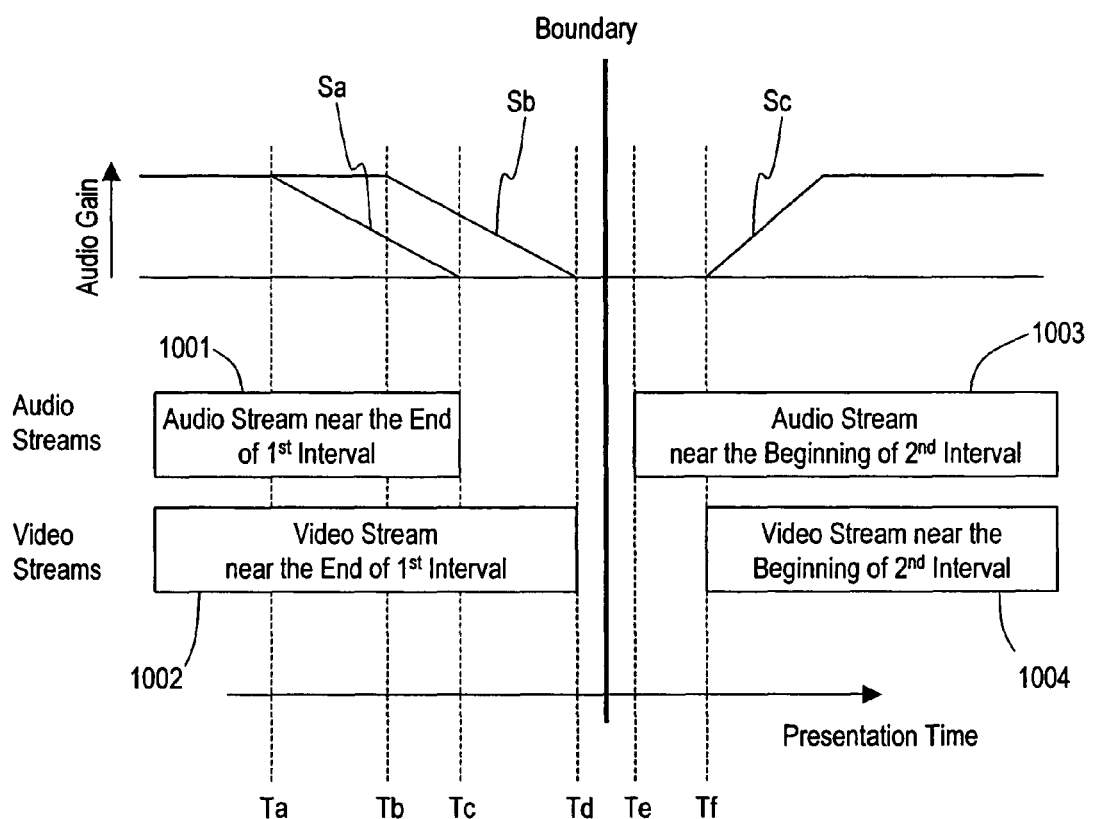

FIG. 19 shows how the relationship between the gain and audio streams should be to make the audio fade out at the end of an interval and fade in at the beginning of the next interval.

Figure 20:
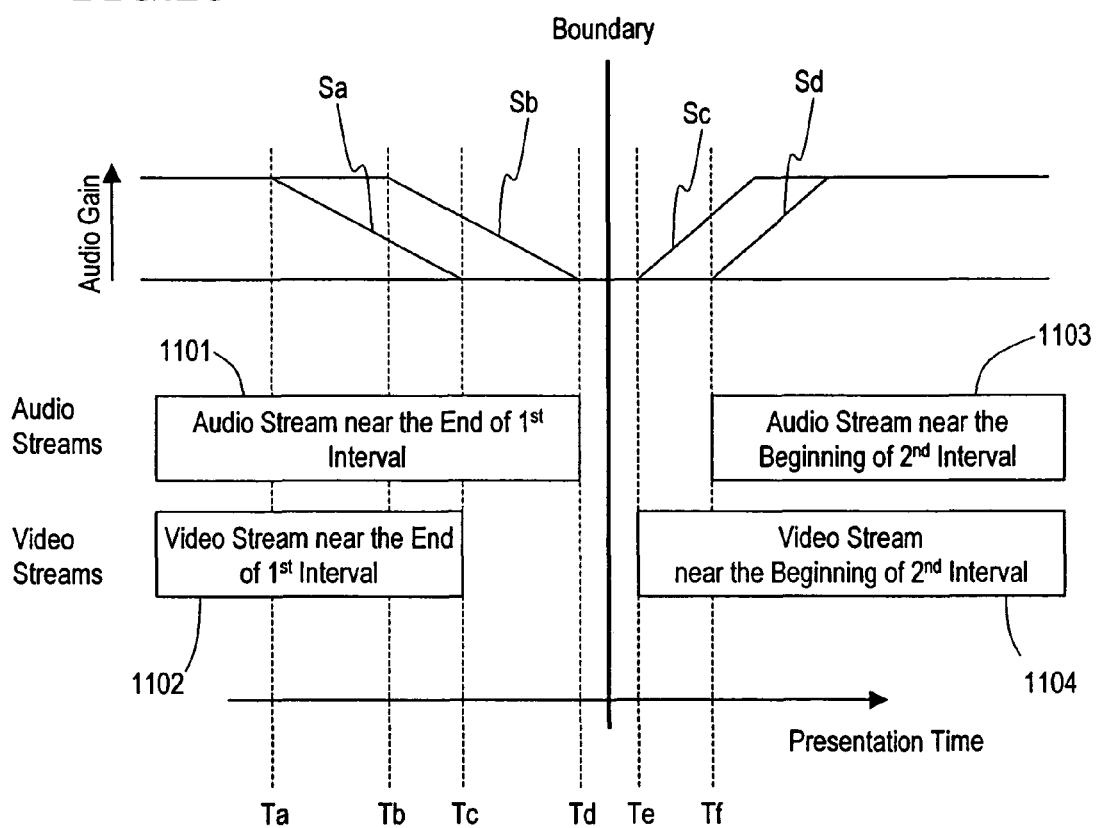

FIG. 20 shows how the relationship between the gain and audio streams should be to make the audio fade out at the end of an interval and fade in at the beginning of the next interval.

BEST MODE FOR CARRYING OUT THE INVENTION

Hereinafter, a data processor according to the present invention will be described with reference to the accompanying drawings. First of all, the data structure of a data stream to be processed will be described. After that, a player will be described as a preferred embodiment of the data processor.

In the following preferred embodiment, the data stream is supposed to be a transport stream (which will be referred to herein as either "TS" simply or "transport stream" fully) as defined by an MPEG-2 standard ISO-13818-1. The TS is known as one form of system stream in which an audio stream and a video stream are multiplexed together.

FIG. 5 shows the data structure of a transport stream 20. The transport stream 20 includes a plurality of TS object units (TOBUs) 21, each of which includes at least one transport packet (TS packet). Examples of those TS packets include a video TS packet (V_TSP) 30 in which compressed and encoded video data is stored, an audio TS packet (A_TSP) 31 in which (compressed and) encoded audio data is stored, a packet (PAT_TSP) in which a program association table (PAT) is stored, a packet (PMT_TSP) in which a program map table (PMT) is stored, and a packet (PCR_TSP) in which a program clock reference (PCR) is stored. Each of these packets has a data size of 188 bytes.

Hereinafter, the video TS packets and audio TS packets, which are relevant to the processing of the present invention, will be described. Since the data structures and data-based functions of packets of the other types have nothing direct to do with the processing of the present invention, the description thereof will be omitted herein.

Figure 1:
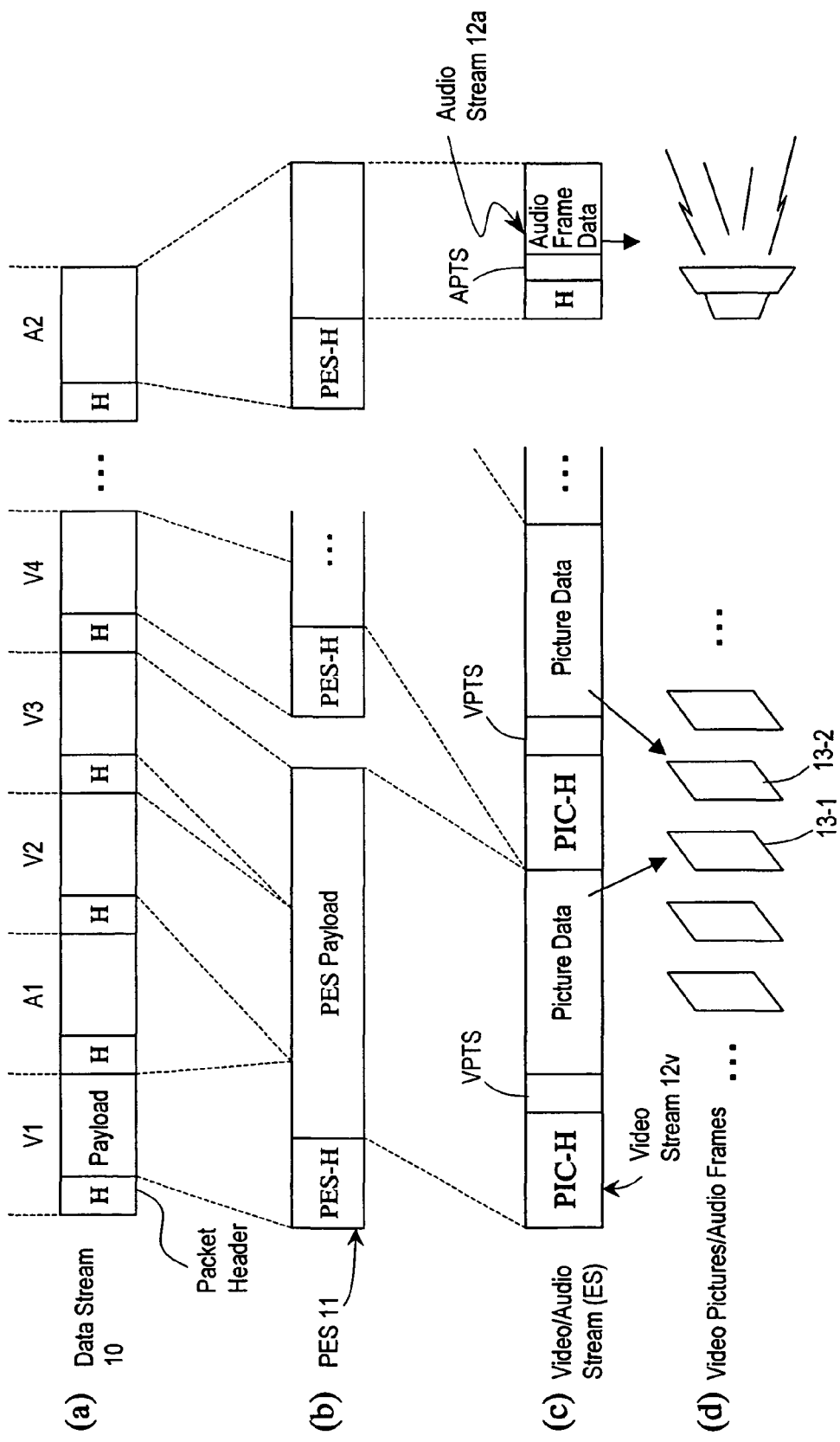
Figure 2:
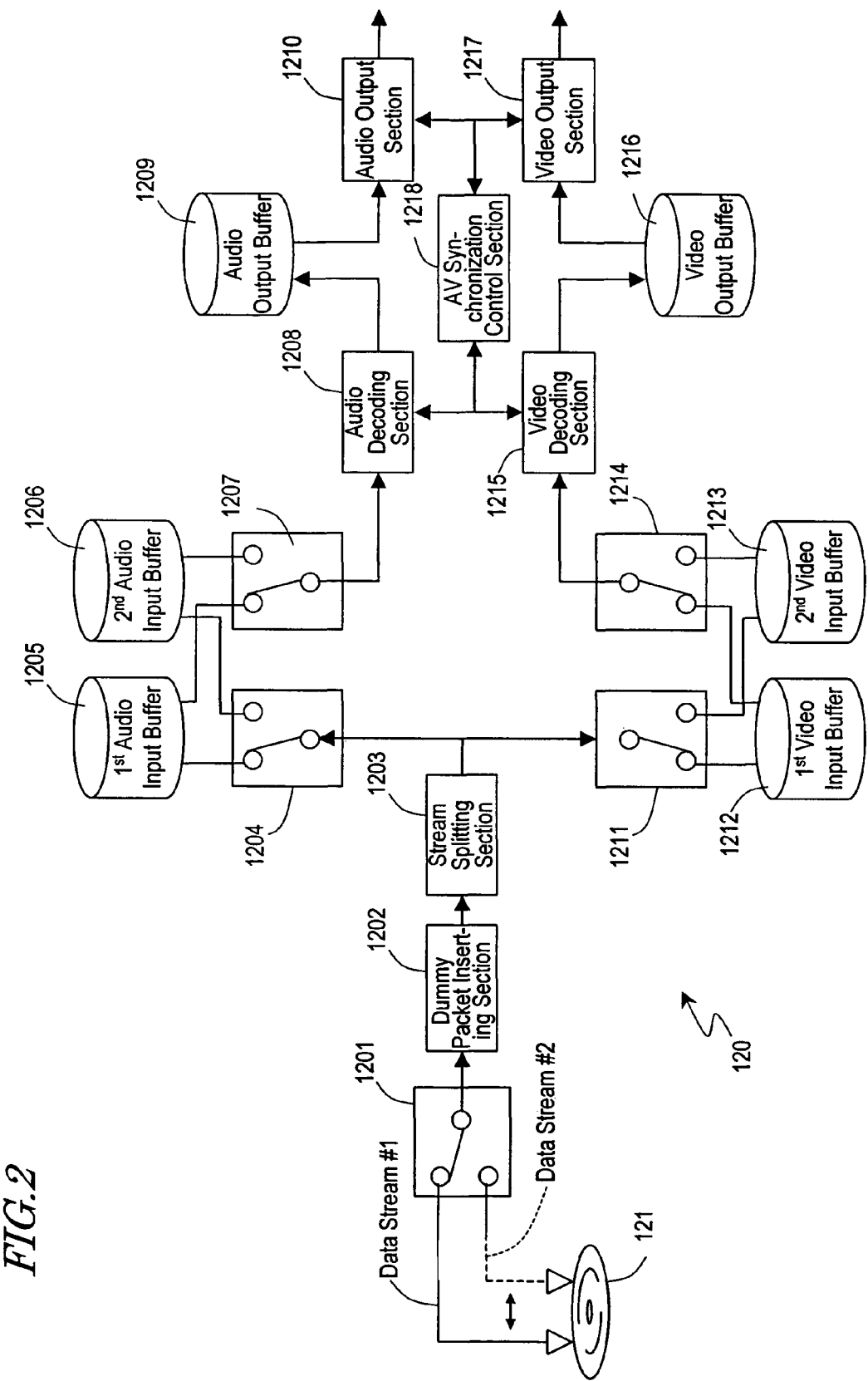
FIG. 2 shows the arrangement of functional blocks in a conventional player 120 that can play back the data stream 10 shown in portion (a) of FIG. 1.
Figure 3:
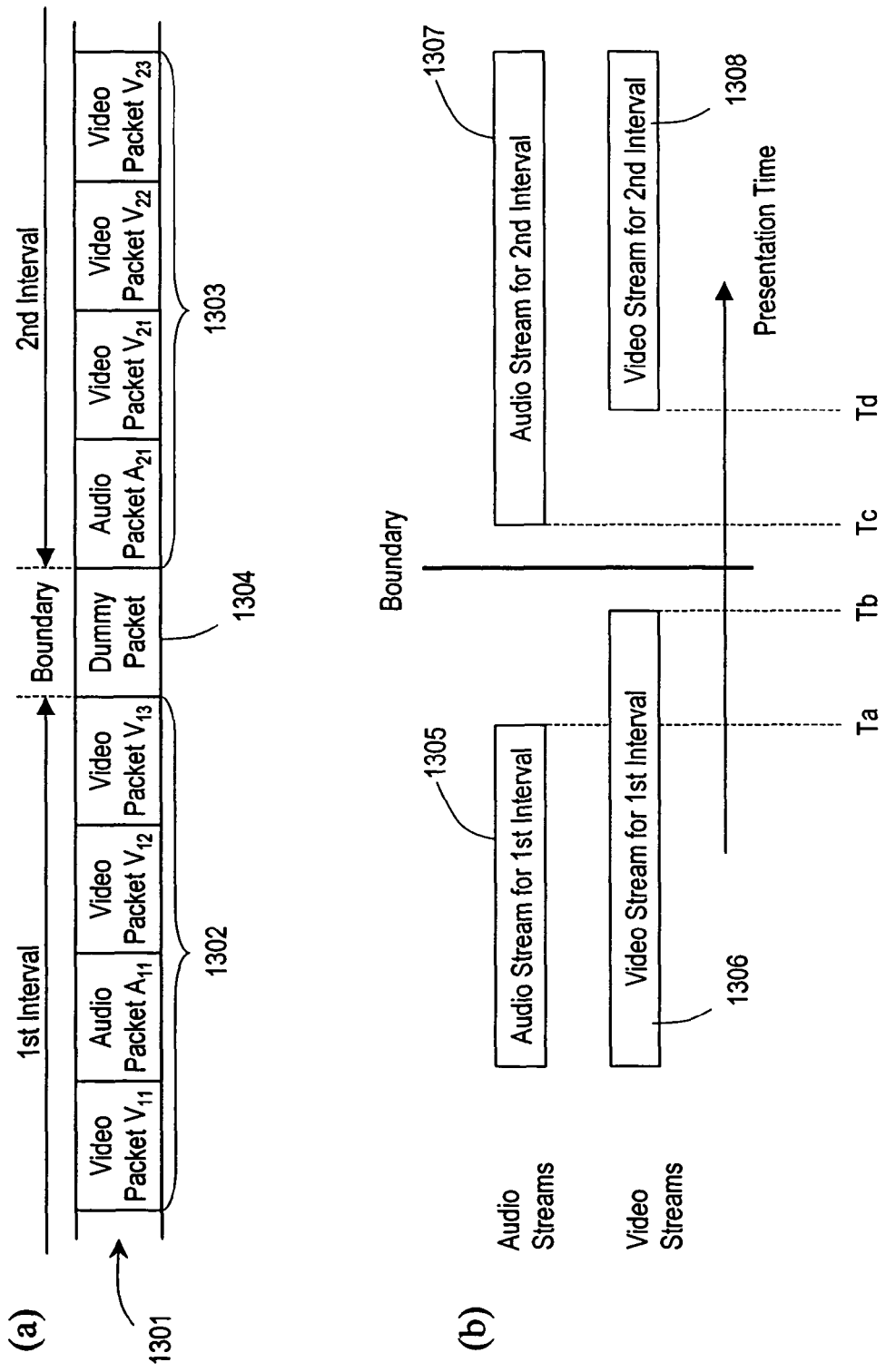
FIG. 3(a) shows a dummy packet 1304 inserted between the first and second intervals.
FIG. 3(b) shows a timing relation between the respective presentation times of the audio and video streams 1305 and 1306 for the first interval and the audio and video streams 1307 and 1308 for the second interval.
Figure 4:
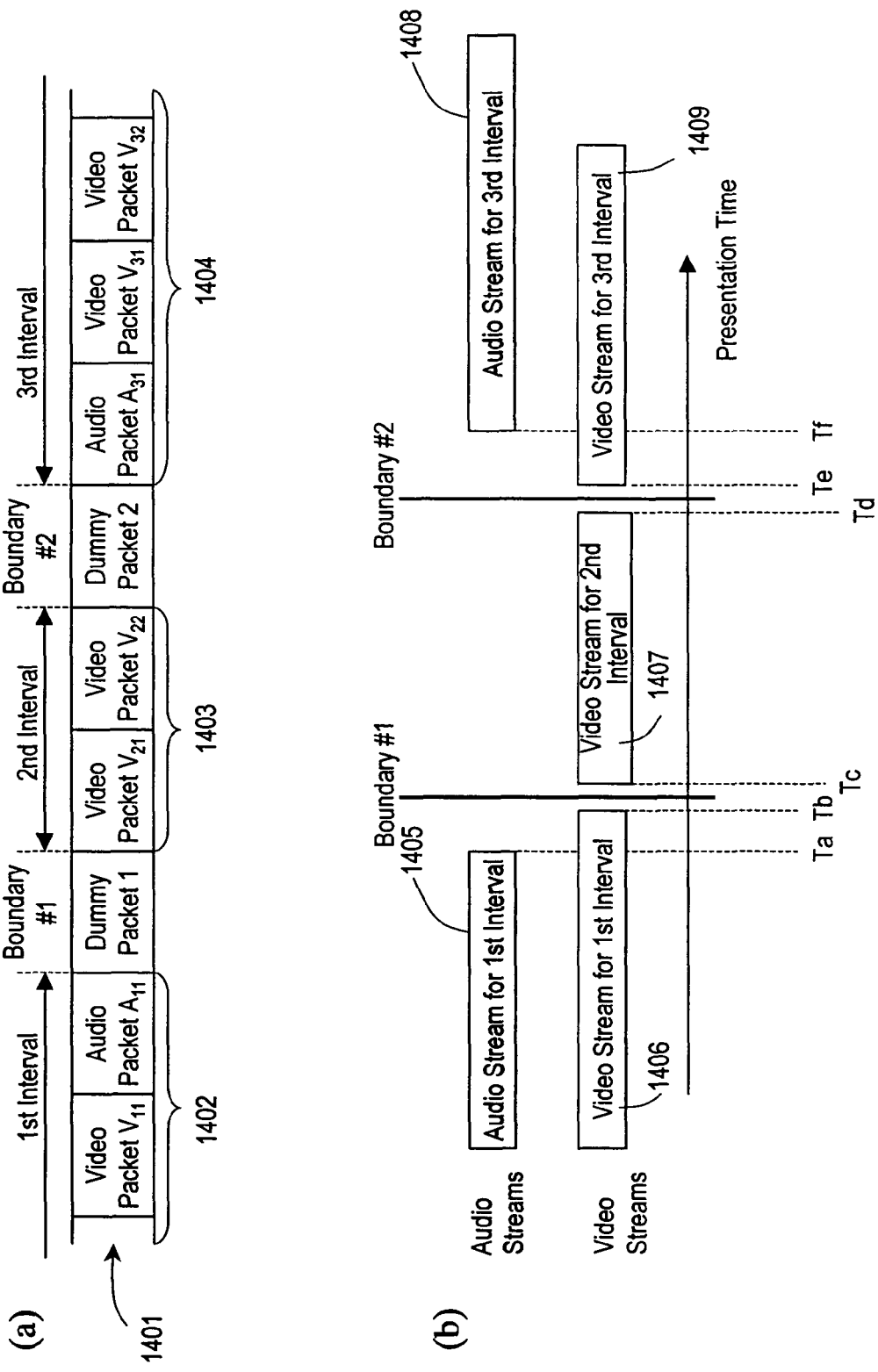
FIG. 4(a) shows a data stream 1401 for which three intervals are defined by two boundaries.
FIG. 4(b) shows the timing relation between the respective presentation times of audio and video streams 1405 and 1406 for the first interval, a video stream 1407 for the second interval, and audio and video streams 1408 and 1409 for the third interval.

FIG. 6(*a*) shows the data structure of a video TS packet 30. The video TS packet 30 includes a transport packet header 30*a* of 4 bytes and a TS payload 30*b* of 184 bytes. The video data described above is stored in the TS payload 30*b*. On the other hand, FIG. 6(*b*) shows the data structure of an audio TS packet 31. The audio TS packet 31 also includes a transport packet header 31*a* of 4 bytes and a TS payload 31*b* of 184 bytes. The audio data described above is stored in the TS payload 31*b*. The video data stored in the TS payload 30*b* and the audio data stored in the TS payload 31*b* are processed and played back as video and audio roughly based on the relationship shown in portions (a) through (d) of FIG. 1.

As can be seen from this example, a TS packet is usually made up of a transport packet header of 4 bytes and a data area of 184 bytes. In the packet header, a packet ID (PID) showing the type of that packet is described. For example, the PID of a video TS packet is 0x0020, while that of an audio TS packet is 0x0021. The data area stores content data such as video data or audio data and control data for controlling the playback. The type of the data stored there changes according to the type of the packet. It should be noted that an area called "adaptation field" may be inserted between the packet header and the TS payload for the purpose of transmitting the control data or adjusting the data size of the payload. However, the prime feature of the processing of this preferred embodiment lies in the processing that uses the payload of a TS packet. Thus, a format with no adaptation fields will be described as an example.

FIGS. 5, 6(*a*) and 6(*b*) show an exemplary data structure of a transport stream. However, this data structure is equally applicable to "packs" included in a program stream because data also follows a packet header in a pack. Nevertheless, the pack is different from the packet in that a pack header is additionally provided before the packet header and that the pack has a data size of 2,048 kilobytes. A "pack" is known as an exemplary form of a packet. It should be noted that the processing to be described below is applicable to not only the program stream but also any other data stream having a similar packet structure.

FIG. 7 shows an arrangement of functional blocks in a player 100 according to this preferred embodiment. The player 100 is loaded with an optical disk 120 such as a Blu-ray Disc and reads a transport stream (TS) from the optical disk 120. Also, the player 100 extracts video data and audio data from video packets and audio packets forming the TS, thereby playing back video and audio.

In this preferred embodiment, a number of TS (e.g., T1 and T2) are supposed to be stored on the optical disk 120. Data about a plurality of contents may be included in a single TS. However, a single content is supposed herein to be included in a single TS for convenience sake. It should be noted that "to play back a content" means herein playing back video and audio included in the content synchronously with each other.

To perform the function of controlling playback processing, the player 100 includes a stream reading section 101, a dummy packet inserting section 102, a stream analyzing section 103, an AV synchronization control section 118, and an ID information storage section 119.

Also, to perform the function of audio playback processing, the player 100 includes a first switch 104, a first audio input buffer 105, a second audio input buffer 106, a third switch 107, an audio decoding section 108, an audio output buffer 109 and an audio output section 110.

Furthermore, to perform the function of video playback processing, the player 100 includes a second switch 111, a first video input buffer 112, a second video input buffer 113, a fourth switch 114, a video decoding section 115, a video output buffer 116 and a video output section 117.

Hereinafter, it will be outlined how the player 100 performs its playback processing before it is described how these components function (or work). The stream reading section 101 reads a plurality of TS continuously from the optical disk 120 and sends them to the dummy packet-inserting section 102. Portion (a) of FIG. 8 shows TS1 that has been read out, portion (b) of FIG. 8 shows TS2 that has been read out after TS1, and portion (c) of FIG. 8 shows TS3 that has been read out after TS2. Continuous reading like this is supposed to be carried out in a situation where the user has specified respective portions of a number of TS as playback intervals on a play list, for example, in order to play them back. Or such reading is also supposed to be performed in a situation where the user has specified respective portions of a number of TS as playback intervals in order to make an editing work of merging those portions together and then play them back.

The dummy packet inserting section 102 inserts a dummy packet between TS1 and TS2 such that the dummy packet is located after the last packet of TS1 and before the first packet of T2. Also, the dummy packet inserting section 102 inserts another dummy packet between TS2 and TS3 such that the dummy packet is located after the last packet of TS2 and before the first packet of T3. Portion (d) of FIG. 8 shows a TS 70 into which the dummy packets have been inserted. A dummy packet 71-1 has been inserted where TS1 and TS2 switch each other, while a dummy packet 71-2 has been inserted where TS2 and TS3 switch each other.

Such a location where two streams switch each other will be referred to herein as a "stream boundary". In portion (d) of FIG. 8, for example, TS1 and TS2 and TS2 and TS3 are combined together at the dummy packets 71-1 and 71-2 as respective boundaries, thereby forming a single transport stream 70. A portion of this TS 70 corresponding to TS1 will be referred to herein as a "first interval", a portion thereof corresponding to TS2 a "second interval", and a portion thereof corresponding to TS3 a "third interval", respectively.

FIG. 9(a) shows the data structure of a dummy packet 71. The dummy packet 71 includes a transport packet header 71a of 4 bytes and a TS payload 71b of 184 bytes. FIG. 9(b) shows a specific data structure of the dummy packet 71. A packet ID (e.g., 0x1FFF) 91, which is different from any of various TS packets shown in FIG. 5, is assigned to the transport packet header 71a. In addition, identification information 92 for use in the playback processing of this preferred embodiment is also described in this transport packet header 71a. Specific processing using the identification information 92 will be described later. Meanwhile, identity information showing the identity as a dummy packet according to this preferred embodiment (e.g., Dummy ID information in FIG. 9(b)) is described in the TS payload 71b. The dummy packet can be easily distinguished from other types of packets by the packet ID and this identity information.

Referring back to FIG. 7, the stream analyzing section 103 separates audio TS packets and video TS packets from TS1 to be received earlier than any other portion of the combined TS 70. Furthermore, the stream analyzing section 103 performs system decoding on the audio TS packets separated, thereby generating an audio elementary stream (which will be referred to herein as an "audio stream"). Also, the stream analyzing section 103 performs system decoding on the video TS packets separated, thereby generating a video elementary stream (which will be referred to herein as a "video stream"). In this case, the stream analyzing section 103 assigns default identification information to TS1 that has been read out first. A unique value that identifies TS1 is assigned as the identification information. Then, the identification information is associated with the audio and video streams that have been subjected to the system decoding.

As used herein, "to associate identification information with an audio stream" means compiling a table in which the frame top address value of the audio stream, the presentation time stamp APTS of that frame, and identification information are associated with each other (see FIG. 16 to be referred to later). On the other hand, "to associate identification information with a video stream" means describing the identification information after the picture header of the video stream (or before the picture data) as will be described later with respect to 15(c).

The stream analyzing section 103 sends the audio stream and the video stream that have been subjected to the processing described above to the first audio input buffer 105 and the first video input buffer 112 by way of the first switch 104 and the second switch 111, respectively.

As a number of TS are read one after another, the stream analyzing section 103 detects the dummy packets in the combined TS 70, thereby acquiring the identification information described in the dummy packets. The value of the identification information in each dummy packet is different from a default value of identification information. Thus, the value of that identification information is assigned as the identification information of TS2. Then, the stream analyzing section 103 performs the same processing on the audio and video packets of TS2 as that performed on the audio and video packets of TS1. The audio and video streams that have been formed by the audio and video packets of TS2 are sent to the second audio input buffer 106 and third switch 107, respectively.

While the audio and video streams are being stored in the respective buffers 105, 106, 112 and 113, the audio decoding section 108 and video decoding section 115 respectively decode the audio and video streams (i.e., perform elementary decoding), thereby generating picture data and audio frames that are ready to be played and output.

The AV synchronization control section 118 manages the correlation between the picture data and audio frames obtained by the decoding process and the identification information that was associated with the audio and video streams before the decoding process. And based on that correlation, the AV synchronization control section 118 controls the timings of outputting the audio and video. More specifically, the AV synchronization control section 118 plays and outputs picture data and audio frames that are associated with the same piece of identification information. The audio and video data obtained from the same TS are provided with the same piece of identification information. Thus, no matter what packets of the transport streams TS1, TS2 and TS3, defining mutually different intervals, are being read out from the respective buffers 105, 106, 112 and 113, only the audio and video of the TS to play can be identified just as intended. In addition, since the timings of outputting the audio and video are controlled in accordance with the presentation time stamps, the audio and video can be played back synchronously with each other just as scheduled when the TS was generated.

Hereinafter, various modes of audio/video synchronous playback realized by the player 100 will be described with reference to FIGS. 10 through 13. In this preferred embodiment, the player 100 controls the playback such that the video is presented continuously before and after the boundary.

FIG. 10 shows a first exemplary relationship between the presentation times of audio and video streams in the vicinity of the boundary. The audio and video streams are supposed to be elementary streams (such as those shown in portion (c) of FIG. 1) and the time designated by the presentation time stamp PTS that is provided for each picture data is described as a presentation time. The same statement applies to FIGS. 11 and 12 to be referred to later.

In the first interval, the video presentation end time Ta of the video stream 502 is earlier than the audio presentation end time Tb of the audio stream 501. Up to the presentation end time Ta, the player 100 plays back audio and video synchronously with each other in accordance with the presentation time stamp PTS. As of the time Ta, however, if the audio were continuously played back, then the video would discontinue because there is no video stream to play anymore. Thus, the player 100 decides that no audio should be reproduced to connect this video to that of the second interval seamlessly. Consequently, the player 100 discards the audio stream 501 from the time Ta through the time Tb.

In this preferred embodiment, as of the time Ta when the video of the first interval finishes being played back, the audio of the first interval and the video of the second interval will never be played back and output synchronously with each other. This is because the player 100 prohibits synchronous playback of audio and video that are provided with different pieces of identification information. In other words, mutually different pieces of identification information are assigned to a number of TS defining respective intervals. Consequently, video and audio, derived from TS of different intervals, are never played back synchronously with each other.

Meanwhile, in the playback during the second interval, the video presentation start time Tc of the video stream 504 is earlier than the audio presentation start time Td of the audio stream 503. In this case, the player 100 plays back and outputs the video but does not reproduce the audio from the time Tc through the time Td. As of the time Td, however, the player 100 plays back the audio and video synchronously with each other. Consequently, the video of the first interval and the video of the second interval are played back without a break.

The playback of the audio stream 501 ends earlier than the boundary by an amount of time ΔTx and the playback of the video stream 502 ends earlier than the boundary by an amount of time ΔTy. This is because the data of a single audio frame or a single picture is separately stored in a plurality of packets. For example, if TS are switched before all packets storing the data of a single picture are processed, then only the picture data that has already been completed just before the switch can be processed. That is why reproducible data is not always present until just before the boundary.

FIG. 11 shows a second exemplary relationship between the presentation times of audio and video streams in the vicinity of the boundary. In the first interval, the audio presentation end time Ta of the audio stream 601 is earlier than the video presentation end time Tb of the video stream 602. In this case, the player 100 continues to play the video through the presentation end time Tb even after the time Ta when the playback of the audio ends. In the second interval on the other hand, the audio presentation start time Tc is earlier than the video presentation start time Td. In this case, the player 100 discards the data of the audio stream 603 from the time Tc through the time Td. As of the time Td, however, the player 100 plays back the audio and video synchronously with each other. In the example shown in FIG. 11, by using the identification information, the video of the first interval and the audio of the second interval are never played back synchronously with each other. Meanwhile, the video of the first interval and the video of the second interval are played back without a break.

FIG. 12 shows a third exemplary relationship between the presentation times of audio and video streams. This example corresponds to a situation where TS1, TS2 and TS3 shown in portions (a), (b) and (c) of FIG. 8 are read out continuously with each other. No audio data that can be reproduced as audio is supposed to be present in the second interval. As can be seen from FIG. 12, no audio stream is present in the second interval.

As to the respective streams of the first interval shown in FIG. 12, the video is played back through the time Tb by the same processing as in the first interval shown in FIG. 11. Next, the video of the video stream 703 for the second interval is played back. At this point in time, the audio stream 704 for the third interval may already be present in the audio input buffer of the player 100. However, mutually different pieces of identification information are assigned to TS2 and TS3 for the second and third intervals. Accordingly, by using these pieces of identification information, the audio of the audio stream 704 for the third interval is never reproduced while the video of the second interval is being played back. More specifically, while the video of the second interval is being played back, the player 100 keeps the audio stream 704, provided with a different piece of identification information, from being reproduced. Thereafter, when the playback for the second interval is over, only the video is played back from the time Te through the time Tf by the same processing as in the second interval shown in FIG. 10. As of the time Tf, the player 100 removes the audio standby for the third interval and plays back the audio and video synchronously with each other.

As described above, the player 100 controls the presentation timings of the video and audio, obtained from the TS of each interval, by reference to the identification information. By using the identification information, even if the audio presentation time stamp APTS of a TS agrees with the video presentation time stamp VPTS of another TS, the audio and video are never played back synchronously with each other. That is to say, only the audio and video streams obtained from the same TS can be played back synchronously with each other without being affected by the presentation time stamps PTS of the streams.

Hereinafter, it will be described exactly how the respective components of the player 100 work to realize the playback processing described above.

FIG. 13 shows the procedure of processing to be done in reading a number of TS continuously. This processing is performed by the stream reading section 101 and dummy packet inserting section 102.

First, when instructed to start reading a TS from the optical disk 120 in Step S201, the stream reading section 101 initializes the identification information n to recognize the stream boundary and sets it to a default value (e.g., zero) in Step S202. In this preferred embodiment, the identification information n is described as being an integer that increases monotonically from the initial value of zero. Alternatively, the default (initial) value of the identification information may also be set to another predetermined value (of 100, for example) such that the identification information may be an integer that decreases monotonically. Next, in Step S203, the stream reading section 101 reads a system stream (TS1) for the first interval on a TS packet basis and then sends it to the dummy packet inserting section 102. Thereafter, the process advances to Step S204.

In Step S204, the dummy packet inserting section 102 determines whether or not the TS have been switched and whether this is a new interval or not. If a TS packet of TS1 is still being received, then the process advances to Step S207. On the other hand, if the transport stream to read has already been switched from TS1 into TS2, then the process advances to Step S205. The information that the TS to read have been switched may be generated by a CPU (not shown), for example. The CPU knows exactly when to switch the TS according to a playback route that has already been defined at the beginning of the playback processing.

In Step S205, the value of the identification information n is incremented by one. Next, in Step S206, the dummy packet inserting section 102 generates a dummy packet including the identification information n and adds it to the last packet of TS1. In Step S207, the dummy packet inserting section 102 sends the TS packet to the stream analyzing section 103. Thereafter, the stream reading section 101 and dummy packet inserting section 102 repeatedly perform the processing of Steps S203 through S207 until the TS packets of all TS to read have been transmitted.

Next, the data structure of the dummy packet 71 will be described in detail with reference to FIG. 9(b) again. The dummy packet 71 shown in FIG. 9(b) is constructed by using the structure of a Null packet of a TS, which is defined by an MPEG standard. This dummy packet 71 is a code sequence that is defined by this preferred embodiment and cannot be present in any TS.

The dummy packet inserting section 102 generates the dummy packet 71 in the following manner. Specifically, first, the dummy packet inserting section 102 defines the PID of the dummy packet 71 as "0x1FFF" as in the Null packet according to the MPEG standard. Furthermore, the dummy packet inserting section 102 defines identity information according to this preferred embodiment in the dummy packet 71. More specifically, the dummy packet inserting section 102 describes the value of the identification information n (of 0x0 through 0xF) in the "continuity_counter" field 92. Since no dummy packet 71 is added to the top of TS1, identification information n of "1" is set for the first dummy packet 71 to be inserted into the boundary between TS1 and T2. Optionally, the identification information may also be described in the "Stuffing_data" field or "Reserved" field.

Also, the dummy packet inserting section 102 may set "1" in the "Payload_unit_start_indicator" field. A Null packet compliant with the MPEG standard has "0" in this field. Also, the dummy packet inserting section 102 newly provides a "Dummy ID information" field and may store a character string "DUM" there, for example. Furthermore, the dummy packet inserting section 102 newly provides a "Dummy_ID" field and stores "0xF" there to show the TS boundary. This provision is adopted to define another TS packet for a different purpose in the future. When these settings are adopted, the stream analyzing section 103 can sense a TS boundary in this dummy packet 71 by detecting and analyzing the dummy packet 71 as will be described later.

In this preferred embodiment, the audio presentation start time stamp (audio_start_PTS), video presentation start time stamp (video_start_PTS), audio presentation end time stamp (audio_end_PTS) and video presentation end time stamp (video_end_PTS) of the following TS are also stored in the dummy packet 71. These time stamps can be acquired when the TS to read are known. Thus, these pieces of information may be read in advance. These time stamps may be used to control the fade-in and fade-out of audio either at the beginning or the end of each interval. The fade-in and fade-out control processing will be described later.

FIG. 14 shows the procedure of processing to be done by the stream analyzing section 103. The stream analyzing section 103 receives TS packets from the dummy packet inserting section 102 and analyzes those packets in Step S209 and then the process advances to Step, S210. In Step S210, the stream analyzing: section 103 determines whether or not the input TS packet is a dummy packet 71. If the answer is YES, then the process advances to Step S211. Otherwise, the process advances to Step S213.

The stream analyzing section 103 extracts the value n of the identification information from the dummy packet 71 in Step S211 and stores it temporarily in Step S212 until the next dummy packet 71 is input. It should be noted that until the first dummy packet 71 is detected, "0" is stored as the default value of the identification information. When the dummy packet is detected, each of the first and second switches 104 and 111 is turned from one side to the other.

In Step S213, the stream analyzing section 103 determines whether or not the input TS packet is a video packet. If the answer is YES, then the process advances to Step S214. Otherwise, the process advances to Step S216. In Step S214, the stream, analyzing section 103 performs system, decoding on the video packet, thereby outputting a video stream. In this case, the identification information is associated with the picture data in the video stream. Thereafter, in Step S215, the stream analyzing section 103 outputs the video stream to either the first video input buffer 112 or the second video input buffer 113w.

Hereinafter, it will be described more fully with reference to portions (a) through (c) of FIG. 15 what processing should be done to associate the identification information. Portion (a) of FIG. 15 shows a TS 70 that has been input to the stream analyzing section 103. In this portion, video packets 70a through 70e and a dummy packet 71 are shown.

The stream analyzing section 103 acquires a TS payload 70a-2 by removing a TS packet header 70a-1 from the TS packet 70a shown in portion (a) of FIG. 15, for example, thereby generating a packetized elementary stream (PES) 80. Portion (b) of FIG. 15 shows the data structure of the PES 80. The PES 80 is made up of a plurality of PES packets 81a, 81b, etc. The PES packet 81a consists of a PES header 81a-1 and a PES payload 81a-2.

The stream analyzing section 103 analyzes the PES header 81a of the PES 80, thereby determining whether or not the PES header 81a includes the presentation time stamp PTS of the picture data in the PES payload 81a-2. The PES header 81a may include a flag field indicating whether the PTS is described or not. Thus, it can be determined by that flag value whether a PTS is included or not. If a PTS is included, then the PTS is stored in the PES header. In the following description, the PTS is supposed to be included.

In the PES payloads 81a-2, etc., data that forms an elementary-level video stream (ES) 82 of respective pictures is stored. The stream analyzing section 103 generates the ES 82 based on the PES payloads 81a-2, etc. Portion (c) of FIG. 15 shows the data structure of the video ES 82. In generating the video ES 82, the stream analyzing section 103 describes a VPTS 82c and identification information 82d, assigned to that TS, between a picture header 82a and picture data 82b. In this manner, the picture data and identification information are associated with each other. It should be noted that the video TS packet 70e shown in portion (a) of FIG. 15 is located after the dummy packet 71 and forms a different TS from the other video TS packets 70a through 70d. Thus, as shown in portion (c) of FIG. 15, the identification information 82j obtained from the video TS packet 70e is associated such that its value n+1 has been incremented by one from the value n of the identification information 82d, 82h obtained from the respective TS packets before the dummy packet.

In portions (a) and (b) of FIG. 15, no data correspondence is shown between the TS packets and the PES payload of the PES packet 81b, which is just for convenience sake. Actually, the data includes the TS payload of a video TS packet (not shown) located between the video TS packet 70d and the dummy packet 71. Also, the video TS packet 70e is shown as the first TS packet that includes a PES header after the dummy packet 71 in that TS. Accordingly, a TS packet including no PES header may be present between the dummy packet 71 and the video TS packet 70e.

Hereinafter, Step S216 and its following processing steps shown in FIG. 14 will be described. In Step S216, the stream, analyzing section 103 determines whether the input TS packet is an audio packet or not. If the answer is YES, the process advances to Step S217. Otherwise, the process returns to Step S210.

In Step S217, the stream analyzing section 103 performs system decoding on the audio packet, thereby outputting an audio stream. In this case, the identification information is associated with the frame data in the audio stream. Thereafter, in Step S218, the stream analyzing section 103 outputs the audio stream to either the first audio input buffer 105 or the second audio input buffer 106.

FIG. 16 shows an audio management table in which frame data and identification information are associated with each other. On the audio management table, the identification information, the presentation time stamps APTS of the audio frames to play, and the storage addresses of audio frame data in the audio input buffer 105 or 106 are described in association with each other. The stream analyzing section 103 sends the table generated to an identification information storage section 119. The identification information storage section 119 holds that table. In the example shown in FIG. 16, the first interval consists of just two frames, and the second interval consists of only three frames. However, this is just an example given to show that the identification information n is changeable. The number of frames is actually bigger in many cases.

The audio decoding section 108 reads out the audio stream from the audio input buffers 105 and 106. For example, by reference to the table stored in the identification information storage section 119 (as shown in FIG. 16), the audio decoding section 108 may read the audio stream on the basis of an entry of that table. Thereafter, the audio decoding section 108 performs elementary decoding on that audio stream. As a result, decompressed and decoded audio frame data can be obtained. The audio decoding section 108 stores the audio frame data in the audio output buffer 109. The storage address is specified by the AD synchronization control section 118.

The video decoding section 115 reads out the video stream from the video input buffers 112 and 113 and then performs elementary decoding on that video stream. The resultant picture data has also been decompressed and decoded. The video decoding section 115 stores the video picture data in the video output buffer 116. The storage address is specified by the AD synchronization control section 118.

The AV synchronization control section 118 instructs the video decoding section 115 at what location (i.e., address) of the video output buffer 116 the video picture data should be stored. Then, the AV synchronization control section 118 collects information to play back the video picture data stored, thereby making a video management table. The video management table is compiled by associating the identification information, VPTS and storage addresses with each other. Thus, the video management table is obtained by replacing APTS in the audio management table shown in FIG. 16 with VPTS. However, the video output buffer 116 has a capacity that is large enough to store data of three to four frames. Accordingly, there is no need to provide as many as seven entries, each consisting of identification information, VPTS and storage address, as shown in FIG. 16. The AV synchronization control section 118 may store the video management table either in the identification information storage section 119 or in its own internal buffer (not shown).

Hereinafter, it will be described with reference to FIGS. 17 and 18 how the AV synchronization control section 118 performs audio and video output control processing. In the following description, the identification information associated with the audio stream (as shown in FIG. 16) will be identified by na and the identification information associated with the video stream (as shown in portion (c) of FIG. 15) will be identified by nv. The identification information na is extracted from the audio management table shown in FIG. 16, while the identification information nv is extracted from the video management table compiled by the AV synchronization control section 118. These pieces of identification information na and nv are supposed to be detected sufficiently earlier than their associated presentation time stamps APTS and VPTS such that the AV synchronization processing can be finished and the decision on whether the signal decoded should be discarded or output can be made by the presentation time specified. Also, the identification information na and nv is supposed to be provided by the stream analyzing section 103 for every first one of the audio and video frames included in each interval and stored in the identification information storage section 119.

FIG. 17 shows the procedure of preprocessing to be done by the AV synchronization control section 118 to output audio and video. The AV synchronization control section 118 acquires the identification information na of the audio stream to be output next in Step S306 and then acquires the identification information nv of the video stream to be output next in Step S307. Thereafter, the process advances to Box A shown in FIG. 18. On the other hand, Boxes B and C leading to Steps S306 and S307 are respectively continued from Boxes B and C shown in FIG. 18.

FIG. 18 shows the procedure of main processing to be done by the AV synchronization control section 118 to output audio and video. In Step S401, the AV synchronization control section 118 determines whether or not the audio frame that is going to be output is located right after the boundary between the first and second intervals (i.e., whether or not the audio frame is the first audio frame of the second interval). This decision is made by comparing the identification information na of the current audio stream with that of the previous audio stream, which is earlier than the current audio stream by one control unit. As used herein, the "one control unit" refers to either an audio frame unit when the audio decoding section 108 decodes an audio stream or the unit of time interval at which the AV synchronization control section 118 performs AV synchronization. In this example, the "one control unit" is supposed to be synchronous with either a video frame unit or a video field unit.

If the audio frame that is going to be output is not the first frame after the boundary, then the process advances to Step S402. On the other hand, if the audio frame is the first frame after the boundary, then the process advances to Step S406. In Step S402, the AV synchronization control section 118 determines whether or not the presentation end time of the audio frame that is about to be output is set later than the presentation end time of the video picture of the first interval. If the answer is NO, then the process advances to Step S403. On the other hand, if the answer is YES, then the process advances to Step S405. In the example shown, in FIG. 11, the presentation time of the audio frame is earlier than the end time of the video picture of the first interval. Thus, in such a situation, the process advances to Step S403. On the other hand, in the example shown in FIG. 10, the presentation time of the audio frame is later than the end time of the video picture of the first interval. Thus, the process advances to Step S405.

It should be noted that the decision of Step S402 is made by comparing the value of the presentation time stamp APTS described in the audio stream with that of the presentation time stamp VPTS described in the video stream. If the APTS value is greater than the VPTS value, then the audio frame associated the APTS value is played back later than the video picture associated with the VPTS value. Conversely, if the former value is smaller than the latter value, then the audio frame is played back earlier than the video picture. The same decision technique will also be used when presentation time stamps are compared in other processing steps.

In a transport stream, a, so-called "wrap-around" of a system clock pulse is allowed. The "wrap-around" means starting counting from zero all over again when a system clock pulse reaches a predetermined value. In this description, no wrap-around should be allowed in comparing the presentation time stamp values described above. If the wrap-around were allowed, then the system clock value would become 0x000000000 once. And if this value were inserted, then data with the greater presentation time stamp value would be played back earlier and data with the smaller presentation time stamp value would be played back later.

In Step S403, the AV synchronization control section 118 performs AV synchronization processing, which is carried out as follows. Specifically, the audio presentation time stamp APTS and video presentation time stamp VPTS in the first interval are compared to the reference time shown by the clock of the player. If the audio and/or video to play are ahead of the reference time, then the AV synchronization control section 118 instructs the audio output section 110 and/or the video output section 117 to delay the output(s). Conversely, if the audio and/or video are behind the reference time, then the AV synchronization control section 118 instructs skip processing, thereby adjusting the output times of the video and audio. The clocking may be kept by reference to either the reference time information included in a TS or one of the APTS and VPTS themselves. In Step S404, under the instruction of the AV synchronization control section 118, the audio output section 110 outputs the audio frame data from the audio output buffer 109 and the video output section 117 outputs the video picture data from the video output buffer 116. As a result, the user can watch the video played back and listen to the audio reproduced.

In Step S405, the AV synchronization control section 118 discards a portion of the audio frame data. To be discarded is a portion of the data of the audio stream in the first interval that would have been played after the end time of the video picture in the first interval. In this case, the audio frame is "discarded" by either deleting the audio frame of the first interval from the output buffer 109 or skipping the audio frame. After the audio frame has been discarded, the process returns to Step S306 (see FIG. 17). During this interval, the video is output from the video output section 117. Then, the AV synchronization control section 118 carries out the processing all over again in accordance with the identification information about the video and audio of the second interval (i.e., the first piece of identification information after the boundary). The playback control for the second interval will be described later.

The decision of Step S402 and the processing to be carried out based on the result of that decision are supposed to be performed on the audio data stored in the audio output buffer 109. Alternatively, the decision and the processing may also be performed on the audio stream stored in the input buffers 105 and 106. Particularly when the stream is discarded, the processing can be simplified significantly because it is only necessary to move the pointer for reading the audio stream stored in the input buffer to the first address of the second interval as stored in the identification information storage section 119.

In Step S406, the audio output section 110 once stops outputting the audio frame data. The branch from Step S401 to Step S406 means that the audio frame data that is going to be output is the frame data at the top of a new interval (i.e., the second interval in this case) in the TS 70.

In Step S407, the AV synchronization control section 118 determines whether or not the identification information na of the audio stream agrees with the identification information nv of the video stream. If the answer is YES, then it means that the video and audio streams being processed currently were stored in the same TS. In that case, the process advances to Step S408. Otherwise, the process advances to Step S410.

In Step S408, the AV synchronization control section 118 determines whether or not the presentation start time of the audio frame that is going to be output is later than that of the video picture. If the answer is YES (i.e., if VPTS value<APTS value), the process advances to Step S403. If the answer is NO (i.e., if VPTS value>APTS value), the process advances to Step S409. In the example shown in FIG. 11, the presentation start time of the audio frame is earlier than that of the video picture in the second interval. In that case, the process advances to Step S409.

In Step S409, one frame of the audio data is discarded. This audio data is discarded because the audio frame before the video picture of the second interval starts to be played is not necessary to play back the video of the first interval and the video of the second interval continuously (i.e., without a break). After the one frame of the data has been discarded in Step S409, the process returns to Step S408 to make the same decision again. As a result, the audio frame data that should have been played between the times Tc and Td in the second interval shown in FIG. 11 is discarded. Thereafter, when the unnecessary audio data has been discarded, the process advances to Step S403, in which AV synchronization processing is carried out. Thereafter, the video picture and audio frame are output synchronously with each other (in Step S404).

Next, in Step S410, it is determined whether or not the value of the audio identification information na is greater than that of the video identification information nv. This processing step is supposed to be carried out only when the value of the audio identification information is found different from that of the video identification information in Step S407 that has been carried out before Step S410. If the audio identification information value is greater than the video identification information value, the process advances to Step S411. On the other hand, if the former value is smaller than the latter value, then the process advances to Step S412.

For example, if there is no audio stream associated with the video stream for the second interval as shown in FIG. 12, then the audio identification information value may be greater than the video identification information value. Conversely, if there is no video stream but only an audio stream is present in the second interval, then the video identification information value may be greater than the audio identification information value.

If the process advances to Step S411 based on the result of the decision made in Step S410, then the AV synchronization control section 118 puts the output of the audio frame data on hold but outputs only video picture data, thereby controlling the process such that only video is played back. Then, after one frame of the video signal has been output, the process will return to Step S307 (see FIG. 17).

If the decision of Step S410 were omitted in the situation shown in FIG. 12, then the audio output section would decode the audio stream 704 for the third interval and output the audio frame data while the video output section 117 is outputting video pictures for the second interval of the video stream 703. However, by using the identification information values, such an erroneous playback can be avoided.

In Step S412, the AV synchronization control section 118 discards the audio frame data through the end of the interval. This is because there is no need to output the audio for the second interval to play back the video continuously. After the audio frame data for the second interval has been discarded, the process returns to Step S306 (see FIG. 17).

As an example, it will be described what processing should be done in the example shown in FIG. 12 after the video represented by the video stream for the second interval has been played back. First, the process returns from Step S412 to Step S306, in which the audio identification information na becomes the audio identification information assigned to the third interval of the TS. Thus, the process will advance to Steps S401, S402 and S405 after that. However, since there is no audio data to discard for the second interval in Step S405, the process returns to Step S306 again (see FIG. 17) by regarding the processing done successfully. As this series of processing steps is repeatedly carried out, the process will soon advance to Steps S403 and S404 as a result of the decision of Step S402. Then, in Step S404, the audio frame data and video picture data for the third interval are output synchronously with each other.

In general, in the second and third intervals shown in FIG. 12, the presentation times of audio and video signals are independent of each other. That is to say, there usually is no correlation at all between the absolute values of presentation time stamps before and after a boundary. Suppose the start point of the second interval happens to be very close to the specified presentation time at the top of the third interval due to proximity in the absolute values of presentation time stamps. In that case, if it were not for the decisions to make in Steps S407 and S410, then the AV synchronization control section 118 might control the process by mistake so as to output the video data for the second interval and the audio data for the third interval synchronously with each other. That is why the decisions to make in Steps S407 and S410 count.

Furthermore, if the identification information associated with an audio stream acquired agrees with that associated with a video stream representing the video that has already been output, the AV synchronization control section 118 may stop reproducing the audio on the audio stream. Instead, the AV synchronization control section 118 may output audio based on an audio stream having the same identification information as that associated with the video stream being output currently.

In the preferred embodiment described above, the AV synchronization control section 118 is supposed to control the audio output section 110 and video output section 117. Alternatively, the AV synchronization control section 118 may control the audio decoding, section 108 and video decoding section 115 instead. In that case, what should be discarded will not be the audio frame data but the audio stream itself. In that case, there is no need to decode the audio stream and the degree of complexity of the computations to be done by the player can be reduced. However, to accurately synchronize the output of audio frame data and video picture data with each other, the audio output section 110 and video output section 117 need to be subjected to the AV synchronization process before the data is output. It should be noted that the data may be discarded by the stream analyzing section 103 in accordance with the presentation time stamps.

In the preferred embodiment described above, the dummy packet inserting section 102 is supposed to update the identification information. Alternatively, the identification information may also be updated by the stream analyzing section 103. If the player 100 is designed such that the stream analyzing section 103 updates the identification information, then the dummy packet inserting section 102 has only to insert a dummy packet that describes a fixed value in the "continuity_counter" field 92. And every time the stream analyzing section 103 detects the dummy packet, the value of the identification information may be updated internally and the addresses and identification information may be associated with each other in each interval of the audio and video streams.

In the foregoing description, the dummy packet is supposed to be inserted between the first and second intervals. Optionally, the dummy packet may also be inserted before the first interval. In that case, even if the audio stream or video stream is missing from the first interval, it is possible to avoid an unwanted situation where audio frame and video picture with mutually different pieces of identification information are played back synchronously with each other.

Hereinafter, a new type of processing carried out by inserting a dummy packet before the first interval will be described with reference to FIGS. 19 and 20. This processing is done to fade-out the audio at an appropriate timing in a range from just before a boundary through the boundary by using the specified presentation time of the audio frame at the end point of the first interval. This processing can also fade-in the audio at the beginning of the second interval.

FIG. 19 shows a first exemplary relationship between the gain and audio streams when the audio should be faded out at the end of an interval and faded in at the beginning of the next interval.

If the time Tc when the audio for the first interval finishes being reproduced is earlier than the time Td when the video for the first interval finishes being played, then the audio reproduction finishes earlier. Accordingly, if the audio starts to be faded out at the time Tb based on the relation with the video presentation time Td, then the audio reproduction will finish at the time Tc even before the audio is faded out fully. As a result, an abnormal sound may be produced. That is why the waveform Sb does not have an appropriate audio gain.

Thus, if the time Tc when the audio for the first interval finishes being reproduced is earlier than the time Td when the video for the first interval finishes being played, then the audio preferably starts to be faded out at the time Ta, which is earlier than the time Tb, in view of the relation with the time Tc when the audio finishes being reproduced. In that case, as represented by the waveform Sa, the audio gain will go zero at the time Tc when the audio reproduction ends. In other words, the audio preferably starts to be faded out at the time Ta, which will be able to decrease the output gain to zero at the time Tc when the audio reproduction ends. Other parameters for determining the time Ta include the audio gain value during the reproduction and the time it takes to fade out the audio.

To realize this processing, an area audio_end_PTS to store an audio presentation end time stamp is defined for a particular code to be inserted before the first interval and the audio presentation end time Tc is described as the presentation time stamp PTS as shown in FIG. 9(b).

The AV synchronization control section 118 determines whether or not the audio presentation end time Tc is earlier than the video presentation end time Td. If the answer is YES, the AV synchronization control section 118 instructs the audio output section 110 to start to fade out the audio at the time Ta, which is earlier than the time Tc by the amount of time it will take to fade out the audio. As a result, the waveform Sa of the audio gain declines as shown in FIG. 19 to go zero at the time Tc. In this manner, it is possible to prevent the abnormal sound from being produced by the fade-out processing at the end of the first interval.

In reading an audio signal after the boundary, if the audio presentation start time Te of the second interval is earlier than the video presentation start time 10f, then a portion of the audio stream from the time Te through the time Tf is discarded as described above. In that case, to play back the video of the first interval and the video of the second interval without a break, the AV synchronization control section 118 may start to fade in the audio at the video presentation start time Tf.

FIG. 20 shows a second exemplary relationship between the gain and audio streams when the audio should be faded out at the end of an interval and faded in at the beginning of the next interval. If the audio presentation end time Td is later than the video presentation end time Tc, then the audio will not be reproduced from the video presentation end time Tc through the time Td as described above. Accordingly, if the audio starts to be faded out based on the relation with the audio presentation end time Td for the first interval, then the audio will not have been faded out by the video presentation end time Tc. As a result, an abnormal sound may be produced at the boundary. That is why the waveform Sb does not have an appropriate audio gain.

Thus, as shown in FIG. 9(b), areas for storing the video presentation end time and the audio presentation end time are provided for a dummy packet. The AV synchronization control section 118 reads information about the video presentation start time Tc and the audio presentation end time Td from those areas. If the audio presentation end time Td is the later, then the audio preferably starts to be faded out at the time Ta, which is earlier than the video presentation end time Tc by the amount of time it will take to fade out the audio fully. As a result, the audio will be faded out fully when the video playback ends before the boundary. Thus, the video and audio can be switched into the second interval without producing any abnormal sound.

In starting to reproduce the audio for the second interval after the boundary, if the audio is faded in at the beginning of that interval, the audio will usually be easier to listen to for the user. Suppose the audio presentation start time Tf after the boundary is later than the video presentation start time Te. In that case, if the fade-in processing is started with the audio gain represented by the waveform Sc (i.e., with the gain increased before the audio is actually output), then a signal with big amplitude will be output suddenly at the audio presentation start time Tf. In such a situation, the loudspeaker as an output device might get damaged. Such a phenomenon may occur if the player 100 is designed such that the AV synchronization control section 118 instructs the audio decoding section 108 not to start decoding the audio stream until the time Tf and makes the audio output section 110 adjust the audio gain.

Thus, as shown in FIG. 9(b), areas for storing the video presentation start time and the audio presentation start time are provided for a dummy packet. The AV synchronization control section 118 reads information about the audio presentation start time Tf and the video presentation start time Te from those areas. If the audio presentation start time Tf is the greater, then the audio signal preferably starts to be faded in at the time Tf.

As described above, by storing the audio and video presentation start times and presentation end times in a dummy packet to be inserted into the top of a system stream, the audio can be faded in and faded out without producing any abnormal sound near the boundary.

The configuration and operation of the player 100 have been described as a preferred embodiment of a data processor according to the present invention. In FIG. 7, the stream reading section 101 is illustrated as a switch. However, this switch does not have to be a mechanical or electrical switch. Rather, the stream reading section 101 may be implemented as anything else as long as the section 101 can read a TS with an arbitrary address specified on the storage medium.

It should be noted that the respective input buffers 105, 106, 112 and 113 of the player 100 are supposed to have the same configuration as the counterparts of the conventional example. Optionally, the first and second audio input buffers 105 and 106 may be combined into a single buffer. Likewise, the first and second video input buffers 112 and 113 may also be combined into a single buffer. In that case, an audio stream extracted from the first interval of a TS and then an audio stream extracted from the second interval of the TS may be stored continuously. Then, the storage addresses of the audio streams for the respective intervals and the identification information n and specified presentation times assigned by the stream analyzing section 103 to the audio streams for the respective intervals may be read by using a table such as that shown in FIG. 16 as described above.

In the foregoing description, the dummy packet 71 is regarded as one of TS packets. However, the present invention is in no way limited to that specific preferred embodiment. The dummy packet may have any other form as long as the stream analyzing section 103 can distinguish it from audio data and video data. Also, the optical disk 120 may be replaced with a hard disk (not shown). A plurality of TS does not have to be stored on the optical disk 120. The above processing may also be applied to a single TS by regarding a number of different intervals of the TS as individual TS.

INDUSTRIAL APPLICABILITY

The present invention provides a data processor that can play audio and video synchronously with each other, without delaying one from the other, in playing back a plurality of data streams continuously.

The invention claimed is:

1. A data processor for playing back video and audio from a data stream including video data and audio data, each of the video and audio data being provided with time information representing its presentation time, the data processor comprising:
   a stream acquiring section for acquiring a first data stream and a second data stream continuously;
   an inserting section for inserting boundary-setting dummy data into a data location where the first and second data streams switch each other;

an analyzing section, which detects the dummy data, assigns different pieces of identification information to the first and second data streams, and associates the identification information with the video and audio data of each said data stream;
a control section for controlling the respective output timings of video represented by video data and audio represented by audio data by reference to the time information of the video data and the time information of the audio data that are associated with the same piece of identification information; and
an output section for outputting the video and the audio at the output timings,
wherein the control section finds the respective presentation end times of the video and the audio of the first data stream according to the time information added to the video data and the time information added to the audio data, and
if the presentation end time of the audio is later than that of the video, the control section stops outputting the audio from the presentation end time of the video through the presentation end time of the audio, and
wherein the control section finds the respective presentation start times of the video and the audio of the second data stream according to the time information added to the video data and the time information added to the audio data, and
if the presentation start time of the audio is earlier than that of the video, the control section stops outputting the audio from the presentation start time of the audio through the presentation start time of the video.

2. The data processor of claim 1, wherein when finding given video data and audio data associated with different pieces of identification information, the control section gets only the video represented by the video data output first, and
wherein when finding video data, obtained after the video has been played back, and the audio data associated with the same piece of identification information, the control section controls the output timings of the video represented by the video data and the audio represented by the audio data in accordance with the time information of the video data and the time information of the audio data that are associated with the same piece of identification information.

3. The data processor of claim 1, wherein the stream acquiring section is able to acquire three or more data streams continuously, and
wherein the inserting section inserts dummy data, which has monotonically increasing or decreasing values corresponding to the identification information, into every data location where associated two of the continuously acquired data stream switch each other.

4. The data processor of claim 3, wherein when finding the piece of identification information associated with the audio data agreeing with a piece of identification information associated with video data representing video that was output in the past, the control section stops outputting audio represented by the audio data and starts outputting audio represented by audio data having the same piece of identification information as that associated with the video data of the video being output currently.

5. The data processor of claim 1, wherein when finding the piece of identification information associated with the audio data agreeing with a piece of identification information associated with video data representing video that has not been output yet, the control section stops outputting audio represented by the audio data and does not start outputting the audio represented by the audio data until the piece of identification information agrees with a piece of identification information associated with video data acquired afterward.

6. The data processor of claim 1, wherein each said data stream has a packet structure including packets that store video data and packets that store audio data, and
wherein the inserting section inserts the boundary-setting dummy packet between the last packet of the first data stream and the first packet of the second data stream.

7. A data processing method for playing back video and audio from a data stream including video data and audio data, each of the video and audio data being provided with time information representing its presentation time, the method comprising the steps of:
acquiring a first data stream and a second data stream continuously;
inserting boundary-setting dummy data into a data location where the first and second data streams switch each other;
detecting the dummy data, assigning different pieces of identification information to the first and second data streams, and associating the identification information with the video and audio data of each said data stream;
controlling the respective output timings of video represented by video data and audio represented by audio data by reference to the time information of the video data and the time information of the audio data that are associated with the same piece of identification information; and
outputting the video and the audio at the output timings,
wherein the step of controlling includes the steps of:
finding the respective presentation end times of the video and the audio of the first data stream according to the time information added to the video data and the time information added to the audio data, and
if the presentation end time of the audio is later than that of the video, stopping outputting the audio from the presentation end time of the video through the presentation end time of the audio, and
wherein the step of controlling includes the steps of:
finding the respective presentation start times of the video and the audio of the second data stream according to the time information added to the video data and the time information added to the audio data, and
if the presentation start time of the audio is earlier than that of the video, stopping outputting the audio from the presentation start time of the audio through the presentation start time of the video.

8. The data processing method of claim 7, wherein the step of controlling includes the steps of:
when finding given video data and audio data associated with different pieces of identification information, getting only the video represented by the video data output first, and
when finding video data, obtained after the video has been played back, and the audio data associated with the same piece of identification information, controlling the output timings of the video represented by the video data and the audio represented by the audio data in accordance with the time information of the video data and the time information of the audio data that are associated with the same piece of identification information.

9. The data processing method of claim 7, wherein the step of acquiring includes acquiring three or more data streams continuously, and
wherein the step of inserting includes inserting dummy data, which has monotonically increasing or decreasing values corresponding to the identification information, into every data location where associated two of the continuously acquired data stream switch each other.

10. The data processing method of claim 9, wherein the step of controlling includes the steps of:

when finding the piece of identification information associated with the audio data agreeing with a piece of identification information associated with video data representing video that was output in the past, stopping outputting audio represented by the audio data and starting outputting audio represented by audio data having the same piece of identification information as that associated with the video data of the video being output currently.

11. The data processing method of claim 7, wherein the step of controlling includes the steps of:

when finding the piece of identification information associated with the audio data agreeing with a piece of identification information associated with video data representing video that has not been output yet, stopping outputting audio represented by the audio data and not starting outputting the audio represented by the audio data until the piece of identification information agrees with a piece of identification information associated with video data acquired afterward.

12. The data processing method of claim 7, wherein each said data stream has a packet structure including packets that store video data and packets that store audio data, and wherein the step of inserting includes inserting the boundary-setting dummy packet between the last packet of the first data stream and the first packet of the second data stream.

\* \* \* \* \*